US012382464B2

(12) United States Patent
Pezeshki et al.

(10) Patent No.: US 12,382,464 B2
(45) Date of Patent: Aug. 5, 2025

(54) TECHNIQUES FOR COMMON BEAM UPDATE RULES FOR SCHEDULED COMMUNICATIONS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 17/537,284

(22) Filed: Nov. 29, 2021

(65) Prior Publication Data

US 2022/0225385 A1    Jul. 14, 2022

Related U.S. Application Data

(60) Provisional application No. 63/137,605, filed on Jan. 14, 2021.

(51) Int. Cl.
*H04W 72/23*     (2023.01)
*H04B 7/08*      (2006.01)

(52) U.S. Cl.
CPC ............ *H04W 72/23* (2023.01); *H04B 7/088* (2013.01)

(58) Field of Classification Search
None
See application file for complete search history.

(56) References Cited

U.S. PATENT DOCUMENTS

| 10,848,222 | B2 * | 11/2020 | Zhou | H04W 16/28 375/267 |
| 11,362,723 | B2 * | 6/2022 | Farag | H04W 72/21 375/262 |
| 2017/0353227 | A1 * | 12/2017 | Liu | H04B 7/0695 |
| 2019/0052331 | A1 * | 2/2019 | Chang | H04B 7/08 375/267 |
| 2019/0098520 | A1 * | 3/2019 | Kim | H04W 76/27 |
| 2020/0304186 | A1 * | 9/2020 | Venugopal | H04B 7/0695 375/267 |
| 2021/0099981 | A1 * | 4/2021 | Cirik | H04W 72/23 370/329 |
| 2021/0152230 | A1 * | 5/2021 | Josan | H04B 7/088 |
| 2021/0184738 | A1 * | 6/2021 | Bai | H04L 5/0048 |
| 2021/0321373 | A1 * | 10/2021 | Rahman | H04L 5/0096 |

(Continued)

*Primary Examiner* — Otis L Thompson, Jr.
(74) *Attorney, Agent, or Firm* — Holland & Hart LLP

(57) ABSTRACT

Methods, systems, and devices for wireless communications are described. A user equipment (UE) may be configured to receive control signaling indicating a beam update configuration that defines a timing for updating a common beam for communications with the UE in relation to a communication and in response to a downlink control information (DCI) message that schedules the communication and indicates an update to the common beam. In some aspects, the common beam is shared across a set of channels, a set of reference signals, or both. The UE may then receive, from a base station, the DCI message that schedules the communication and indicates the update to the common beam. The UE may then perform at least one beam switching procedure to update the common beam at the UE based on receiving the DCI message and in accordance with the beam update configuration.

30 Claims, 17 Drawing Sheets

(56) References Cited

U.S. PATENT DOCUMENTS

| | | | | |
|---|---|---|---|---|
| 2021/0337525 A1* | 10/2021 | Rahman | ................ | H04L 5/0094 |
| 2022/0132549 A1* | 4/2022 | Yu | ........................ | H04L 1/1812 |
| 2022/0150944 A1* | 5/2022 | Venugopal | ............. | H04B 7/088 |
| 2022/0190883 A1* | 6/2022 | Kaya | ..................... | H04W 36/08 |
| | | | | 370/331 |
| 2022/0200675 A1* | 6/2022 | Rhagavan | ............ | H04B 7/0695 |
| | | | | 375/299 |
| 2022/0225298 A1* | 7/2022 | Zhang | ................... | H04L 5/0048 |
| 2022/0225299 A1* | 7/2022 | Pezeshki | ............... | H04L 5/0053 |
| 2023/0239125 A1* | 7/2023 | Yi | ........................ | H04L 5/0048 |
| | | | | 370/329 |
| 2023/0284045 A1* | 9/2023 | Go | ........................ | H04W 28/20 |
| | | | | 370/329 |
| 2023/0292335 A1* | 9/2023 | Park | .................... | H04W 72/232 |
| | | | | 370/328 |
| 2023/0328830 A1* | 10/2023 | Yi | ........................ | H04W 76/19 |
| | | | | 370/329 |

\* cited by examiner

DCI Message 415

Communication 420

TECHNIQUES FOR COMMON BEAM UPDATE RULES FOR SCHEDULED COMMUNICATIONS

CROSS REFERENCE

The present Application for Patent claims the benefit of U.S. Provisional Patent Application No. 63/137,605 by PEZESHKI et al., entitled "TECHNIQUES FOR COMMON BEAM UPDATE RULES FOR SCHEDULED COMMUNICATIONS," filed Jan. 14, 2021, assigned to the assignee hereof, and expressly incorporated by reference herein.

FIELD OF TECHNOLOGY

The following relates to wireless communications, including techniques for common beam update rules for scheduled communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may enable the network (e.g., base stations) to update beams used for communications at a UE via downlink control information (DCI) messages.

SUMMARY

The described techniques relate to improved methods, systems, devices, and apparatuses that support techniques for common beam update rules for scheduled communications. Generally, aspects of the present disclosure provide techniques for configuring and/or signaling beam update configurations which define a timing for updating a common beam for communications with a user equipment (UE). For example, a UE may be configured with (e.g., via radio resource control (RRC) or other control signaling) one or more beam update configurations. Each beam update configuration may define a timing for updating a common beam for communications with the UE in relation to a downlink control information (DCI) message which updates a common beam at the UE and schedules a communication at the UE. Subsequently, upon receiving a DCI message which updates a common beam and schedules a communication at the UE, the UE may perform one or more beam switching procedures to update the common beam in accordance with the one or more beam update configurations. In some aspects, the DCI scheduling the transmission may indicate which beam update configuration is to be used.

A method for wireless communication at a UE is described. The method may include receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, receiving, from a base station, the DCI message that schedules the communication and indicates the update to the common beam, and performing at least one beam switching procedure to update the common beam for communications with the UE based on receiving the DCI message and in accordance with the beam update configuration.

An apparatus for wireless communication at a UE is described. The apparatus may include a processor, memory in electronic communication with the processor, and instructions stored in the memory. The instructions may be executable by the processor to cause the apparatus to receive control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, receive, from a base station, the DCI message that schedules the communication and indicates the update to the common beam, and perform at least one beam switching procedure to update the common beam for communications with the UE based on receiving the DCI message and in accordance with the beam update configuration.

Another apparatus for wireless communication at a UE is described. The apparatus may include means for receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, means for receiving, from a base station, the DCI message that schedules the communication and indicates the update to the common beam, and means for performing at least one beam switching procedure to update the common beam for communications with the UE based on receiving the DCI message and in accordance with the beam update configuration.

A non-transitory computer-readable medium storing code for wireless communication at a UE is described. The code may include instructions executable by a processor to receive control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, receive, from a base station, the DCI message that schedules the communication and indicates the update to the common beam, and perform at least one beam switching procedure to update the common beam for communications with the UE based on receiving the DCI message and in accordance with the beam update configuration.

In some examples of the method, apparatuses, and non-transitory computer-readable medium described herein, performing the at least one beam switching procedure in accordance with the beam update configuration may include operations, features, means, or instructions for identifying a time interval between reception of the DCI message and the communication and performing the at least one beam switching procedure to update the common beam based on a comparison of the time interval with a processing time threshold of the UE.

Some examples of the method, apparatuses, and non-transitory computer-readable medium described herein may further include operations, features, means, or instructions for performing the at least one beam switching procedure to update the common beam after performing the communication scheduled by the DCI based on the time interval being less than the processing time threshold.

In some examples of the method, apparatuses, and non-transitory computer-readable medium described herein, the UE receives the DCI message and performs the communication scheduled by the DCI message using the same beam.

Some examples of the method, apparatuses, and non-transitory computer-readable medium described herein may further include operations, features, means, or instructions for performing the at least one beam switching procedure to update the common beam prior to performing the communication scheduled by the DCI based on the time interval being greater than or equal to the processing time threshold and performing the communication scheduled by the DCI using the updated common beam and based on performing the at least one beam switching procedure.

Some examples of the method, apparatuses, and non-transitory computer-readable medium described herein may further include operations, features, means, or instructions for transmitting, to the base station, an indication of the processing time threshold, where receiving the DCI message may be based on transmitting the processing time threshold.

In some examples of the method, apparatuses, and non-transitory computer-readable medium described herein, the processing time threshold of the UE may be based on a first time duration associated with downlink control channel processing at the UE, a second time duration associated with retuning radio frequency components at the UE, or both.

In some examples of the method, apparatuses, and non-transitory computer-readable medium described herein, the processing time threshold of the UE includes a quantity of slots, a quantity of symbols, or both.

In some examples of the method, apparatuses, and non-transitory computer-readable medium described herein, performing the at least one beam switching procedure in accordance with the beam update configuration may include operations, features, means, or instructions for performing the communication scheduled by the DCI and performing the at least one beam switching procedure to update the common beam based on performing the communication scheduled by the DCI.

In some examples of the method, apparatuses, and non-transitory computer-readable medium described herein, the UE receives the DCI message and performs the communication scheduled by the DCI message using the same beam.

In some examples of the method, apparatuses, and non-transitory computer-readable medium described herein, receiving the control signaling indicating the beam update configuration may include operations, features, means, or instructions for receiving, from the base station, an RRC message indicating one or more beam update configurations including the beam update configuration, where performing the at least one beam switching procedure in accordance with the beam update configuration may be based on receiving the RRC message.

In some examples of the method, apparatuses, and non-transitory computer-readable medium described herein, the one or more beam update configurations indicated via the RRC message include a set of multiple beam update configurations and the method, apparatuses, and non-transitory computer-readable medium may include further operations, features, means, or instructions for receiving, via the DCI message, an indication of the beam update configuration included within the set of multiple beam update configurations, where performing the at least one beam switching procedure in accordance with the beam update configuration may be based on receiving the RRC message, the DCI message, or both.

In some examples of the method, apparatuses, and non-transitory computer-readable medium described herein, receiving the control signaling indicating the beam update configuration may include operations, features, means, or instructions for receiving an indication of the beam update configuration via the DCI message, where performing the at least one beam switching procedure in accordance with the beam update configuration may be based on receiving the DCI message.

Some examples of the method, apparatuses, and non-transitory computer-readable medium described herein may further include operations, features, means, or instructions for receiving, via the DCI message, a common transmission-configuration indicator (TCI) state for updating the common beam, where performance of the at least one beam switching procedure may be based on the common TCI state.

In some examples of the method, apparatuses, and non-transitory computer-readable medium described herein, the communication includes a physical downlink shared channel (PDSCH) transmission, a physical uplink shared channel (PUSCH) transmission, a physical uplink control channel (PUCCH) transmission, or any combination thereof.

In some examples of the method, apparatuses, and non-transitory computer-readable medium described herein, the common beam may be shared across a downlink channel and an uplink channel.

In some examples of the method, apparatuses, and non-transitory computer-readable medium described herein, the common beam may be shared across a first downlink channel and a second downlink channel.

In some examples of the method, apparatuses, and non-transitory computer-readable medium described herein, the common beam may be shared across a first uplink channel and a second uplink channel.

A method for wireless communication at a base station is described. The method may include transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, transmitting, to the UE, the DCI message that schedules the communication and indicates the update to the common beam, and communicating with the UE via the communication, an additional transmission, or both, based on transmitting the DCI message and in accordance with the beam update configuration.

An apparatus for wireless communication at a base station is described. The apparatus may include a processor, memory in electronic communication with the processor, and instructions stored in the memory. The instructions may be executable by the processor to cause the apparatus to transmit, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, transmit, to the UE, the DCI message that schedules the communication and indicates the update to the common beam, and communicate with the UE via the communication, an additional transmission, or both, based on transmitting the DCI message and in accordance with the beam update configuration.

Another apparatus for wireless communication at a base station is described. The apparatus may include means for transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, means for transmitting, to the UE, the DCI message that schedules the communication and indicates the update to the common beam, and means for communicating with the UE via the communication, an additional transmission, or both, based on transmitting the DCI message and in accordance with the beam update configuration.

A non-transitory computer-readable medium storing code for wireless communication at a base station is described. The code may include instructions executable by a processor to transmit, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both, transmit, to the UE, the DCI message that schedules the communication and indicates the update to the common beam, and communicate with the UE via the communication, an additional transmission, or both, based on transmitting the DCI message and in accordance with the beam update configuration.

Some examples of the method, apparatuses, and non-transitory computer-readable medium described herein may further include operations, features, means, or instructions for identifying a time interval between transmission of the DCI and the communication, where communicating with the UE in accordance with the beam update configuration may be based on a comparison of the time interval with a processing time threshold of the UE.

Some examples of the method, apparatuses, and non-transitory computer-readable medium described herein may further include operations, features, means, or instructions for receiving, from the UE, an indication of the processing time threshold, where transmitting the DCI message may be based on receiving the processing time threshold.

In some examples of the method, apparatuses, and non-transitory computer-readable medium described herein, the processing time threshold of the UE may be based on a first time duration associated with downlink control channel processing at the UE, a second time duration associated with retuning radio frequency components at the UE, or both.

In some examples of the method, apparatuses, and non-transitory computer-readable medium described herein, the processing time threshold of the UE includes a quantity of slots, a quantity of symbols, or both.

In some examples of the method, apparatuses, and non-transitory computer-readable medium described herein, transmitting the control signaling indicating the beam update configuration may include operations, features, means, or instructions for transmitting, to the UE, an RRC message indicating one or more beam update configurations including the beam update configuration, where communicating with the UE in accordance with the beam update configuration may be based on transmitting the RRC message.

In some examples of the method, apparatuses, and non-transitory computer-readable medium described herein, the one or more beam update configurations indicated via the RRC message include a set of multiple beam update configurations and the method, apparatuses, and non-transitory computer-readable medium may include further operations, features, means, or instructions for transmitting, via the DCI message, an indication of the beam update configuration included within the set of multiple beam update configurations, where communicating with the UE in accordance with the beam update configuration may be based on transmitting the RRC message, the DCI message, or both.

In some examples of the method, apparatuses, and non-transitory computer-readable medium described herein, transmitting the control signaling indicating the beam update configuration may include operations, features, means, or instructions for transmitting an indication of the beam update configuration via the DCI message, where communicating with the UE in accordance with the beam update configuration may be based on transmitting the DCI message.

Some examples of the method, apparatuses, and non-transitory computer-readable medium described herein may further include operations, features, means, or instructions for transmitting, via the DCI message, a common TCI state for updating the common beam, where communicating with the UE in accordance with the beam update configuration may be based on the common TCI state.

In some examples of the method, apparatuses, and non-transitory computer-readable medium described herein, the communication includes a PDSCH transmission, a PUSCH transmission, a PUCCH transmission, or any combination thereof.

In some examples of the method, apparatuses, and non-transitory computer-readable medium described herein, the common beam may be shared across a downlink channel and an uplink channel.

In some examples of the method, apparatuses, and non-transitory computer-readable medium described herein, the common beam may be shared across a first downlink channel and a second downlink channel.

In some examples of the method, apparatuses, and non-transitory computer-readable medium described herein, the common beam may be shared across a first uplink channel and a second uplink channel.

DETAILED DESCRIPTION

Figure 1:
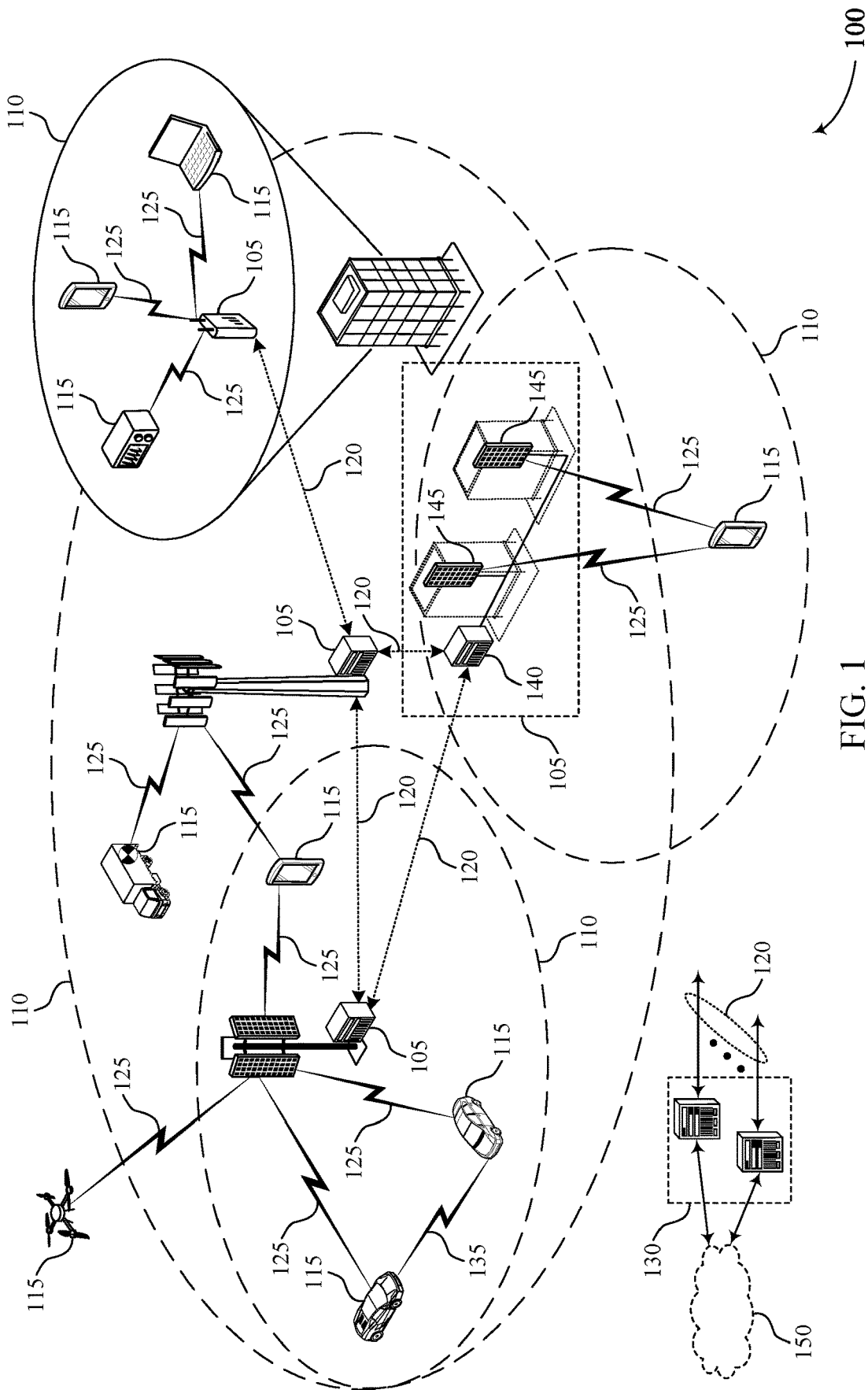
FIG. 1 illustrates an example of a wireless communications system that supports techniques for common beam update rules for scheduled communications in accordance with aspects of the present disclosure.

Some wireless communications systems may enable a network (e.g., base stations) to update beams used for communications at a user equipment (UE) via downlink control information (DCI) messages. DCI messages may indicate transmission-configuration indicator (TCI) states which instruct a UE to update a beam used by the UE. In some conventional systems, a single DCI message was only capable of updating a single beam at a UE. In other wireless communications systems, a single DCI message may be configured to update multiple beams at a UE. In particular, a single DCI message may indicate a common TCI state which updates a common beam at a UE, where the common beam is shared across multiple channels, multiple reference signals, or both. For example, a DCI may include a common TCI state which updates a common beam at the UE that is used for an uplink channel and a downlink channel, multiple uplink channels, multiple downlink channels, or any combination thereof.

Enabling a single DCI message to update multiple beams (e.g., a common beam) at a UE may reduce control signaling overhead within a wireless communications system. However, current wireless communications systems do not provide signaling or other rules which instruct a UE as to when an update to a common beam should be implemented. As such, upon receiving a DCI message which schedules a transmission and indicates an update to a common beam, a UE may not know when the update to the common beam should be implemented.

Accordingly, aspects of the present disclosure provide techniques for configuring and/or signaling beam update configurations which define a timing for updating a common beam for communications with a UE. For example, a UE may be configured with (e.g., via radio resource control (RRC) or other control signaling) one or more beam update configurations. Each beam update configuration may define a timing for updating a common beam in relation to a DCI message which updates a common beam for communications with the UE and schedules a communication at the UE. Subsequently, upon receiving a DCI message which updates a common beam and schedules a communication (e.g., physical downlink shared channel (PDSCH) transmission, physical uplink control channel (PUCCH) transmission, physical uplink shared channel (PUSCH) transmission) at the UE, the UE may perform one or more beam switching procedures to update the common beam in accordance with the one or more beam update configurations. In some aspects, the DCI scheduling the transmission may indicate which beam update configuration is to be used.

According to a first beam update configuration, the UE may perform the beam switching procedures to update the common beam before or after the communication scheduled by the DCI based on a relative timing of the communication relative to a processing timeline (e.g., processing time threshold) at the UE. For example, if the communication is scheduled before the processing time threshold (e.g., before the UE has sufficient time to process the DCI and/or retune radio frequency components), the UE may update the common beam after the scheduled communication. Conversely, if the communication is scheduled after the processing time threshold, the UE may update the common beam prior to the scheduled communication, and may perform the scheduled communication using the updated common beam. According to a second beam update configuration, the UE may update the common beam after the scheduled communication, regardless of whether the processing time threshold of the UE is satisfied. A UE may be configured with any quantity of beam update configurations which define different timings for implementing updates to common beams.

By providing signaling and other configurations which indicate when a UE should implement updates to common beams, the techniques described herein may enable the network to update multiple beams (e.g., a common beam) at UEs using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at a UE, thereby improving the efficiency of wireless communications within the wireless communications system.

Aspects of the disclosure are initially described in the context of wireless communications systems. Additional aspects of the disclosure are described in the context of example beam update configurations and an example process flow. Aspects of the disclosure are further illustrated by and described with reference to apparatus diagrams, system diagrams, and flowcharts that relate to techniques for common beam update rules for scheduled communications.

FIG. 1 illustrates an example of a wireless communications system 100 that supports techniques for common beam update rules for scheduled communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

According to some implementations, downlink beamforming at a base station 105 may be performed such that it is transparent to a UE 115, and vice versa. That is, when performing downlink beamforming at a base station 105-b, a UE 115 does not need to know what beam is used at the base station 105. In cases where the wireless communications system 100 supports NR, the wireless communications system 100 may also support signaling for beam indications. In practice, a base station 105 may inform a UE 115 that a respective PDSCH and/or physical downlink control channel (PDCCH) transmission uses the same transmission beam as a configured reference signal (e.g., CSI-RS, synchronization signal block). Moreover, beam indications may be used to inform a UE 115 that a respective PDSCH and/or PDCCH is transmitted using the same spatial filter as the configured reference signal.

As noted previously herein, beam indications may be based on configurations and signaling TCI states. Each TCI state may include information associated with one or more beams, including information regarding reference signals (e.g., CSI-RS, synchronization signal block), quasi co-location (QCL) configurations, spatial filters, and the like. In this regard, associating transmissions (e.g., reference signals, PDCCH transmissions, PDSCH transmissions) with a given TCI state may indicate, to other wireless devices, that the respective transmission was performed using a spatial filter associated with the TCI state.

In some cases, a wireless device (e.g., UE 115) may be configured with up to sixty-four candidate TCI states. RRC signaling may be used to assign candidate TCI states for each configured CORESET for PDCCH transmissions. Subsequently, after configuring candidate TCI states via RRC signaling, MAC signaling may be used to dynamically indicate a specific TCI state, within each CORESET-configured subset, which is to be activated. As such, once a receiving device (e.g., UE 1150) has determined a suitable receiver-side beam direction for reception of the reference signals, the receiving device may be configured to use the same beam (e.g., same beam direction) for other transmissions, such as PDCCH transmissions.

In the context of PDSCH transmissions, there are two alternatives for indicating beam indicators. The indication of beam indicators for PDSCH transmissions may depend on the scheduling offset of the respective PDSCH transmission (e.g., scheduling offset of the PDSCH transmission relative to the corresponding PDCCH transmission scheduling the PDSCH transmission). If this scheduling offset is larger than N symbols, the DCI message scheduling the PDSCH transmission may explicitly indicate the TCI state for the PDSCH transmission. In such cases, the UE 115 may be pre-configured (e.g., via RRC signaling) with up to eight TCI states from a set of candidate TCI states, and the DCI message may include an indication (e.g., three-bit indicator) of the active TCI state from the set of TCI states which is to be activated for the PDSCH transmission. Comparatively, ff the scheduling offset of a PDSCH transmission is less than or equal to N symbols, a UE 115 may be configured to determine that the PDSCH transmission is QCL with the corresponding PDCCH transmission scheduling the PDSCH transmission. In other words, the UE 115 may be configured to determine that the TCI state indicated via MAC signaling is also valid for the PDSCH transmission. The varying techniques for determining TCI states relative to the scheduling offset may be based on a processing time at the UE 115 which is required for decoding the TCI information and performing beam switching procedures in order to receive the PDSCH transmission.

In some aspects, the UEs 115 and the base stations 105 of the wireless communications system 100 may support techniques for configuring and/or signaling beam update configurations which define a timing for updating a common beam for communications with a UE 115. In particular, techniques described herein may define beam update configurations and signaling for beam update configurations which may improve the implementation of common beam updates at a UE 115.

For example, a UE 115 of the wireless communications system 100 may be configured with (e.g., via RRC or other control signaling) one or more beam update configurations. Each beam update configuration may define a timing for updating a common beam for communications with the UE 115 in relation to a DCI message which updates a common beam for communications with the UE 115 and schedules a communication with the UE 115. As noted previously herein, a common beam may be shared across multiple channels, multiple reference signals, or both. For example, a common beam may be used for an uplink channel and a downlink channel, multiple uplink channels, multiple downlink channels, or any combination thereof.

Subsequently, the UE 115 may receive a DCI message which updates a common beam and schedules a communication (e.g., PDSCH transmission, PUCCH transmission, PUSCH transmission) at the UE 115. Upon receiving the DCI message, the UE 115 may perform one or more beam switching procedures to update the common beam in accordance with the one or more beam update configurations. In some aspects, the DCI scheduling the communication may indicate which beam update configuration is to be used.

According to a first beam update configuration, the UE 115 may perform the beam switching procedures to update the common beam before or after the communication scheduled by the DCI message based on a relative timing of the communication relative to a processing timeline (e.g., processing time threshold) at the UE 115. For example, if the communication is scheduled before the processing time threshold (e.g., before the UE 115 has sufficient time to process the DCI message and/or retune radio frequency components), the UE 115 may update the common beam after the scheduled communication. Conversely, if the communication is scheduled after the processing time threshold, the UE 115 may update the common beam prior to the scheduled communication, and may perform the scheduled communication using the updated common beam. According to a second beam update configuration, the UE 115 may update the common beam after the scheduled communication, regardless of whether the processing time threshold of the UE 115 is satisfied. In some aspects, each UE 115 of the wireless communications system 100 may be configured with any quantity of beam update configurations which define different timings for implementing updates to common beams.

The techniques described herein may provide signaling and other configurations which indicate when a UE 115 should implement updates to common beams. As such, the techniques described herein may enable the network to update multiple beams (e.g., a common beam) at UEs 115 using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at a UE 115, thereby improving the efficiency of wireless communications within the wireless communications system 100.

Figure 2:
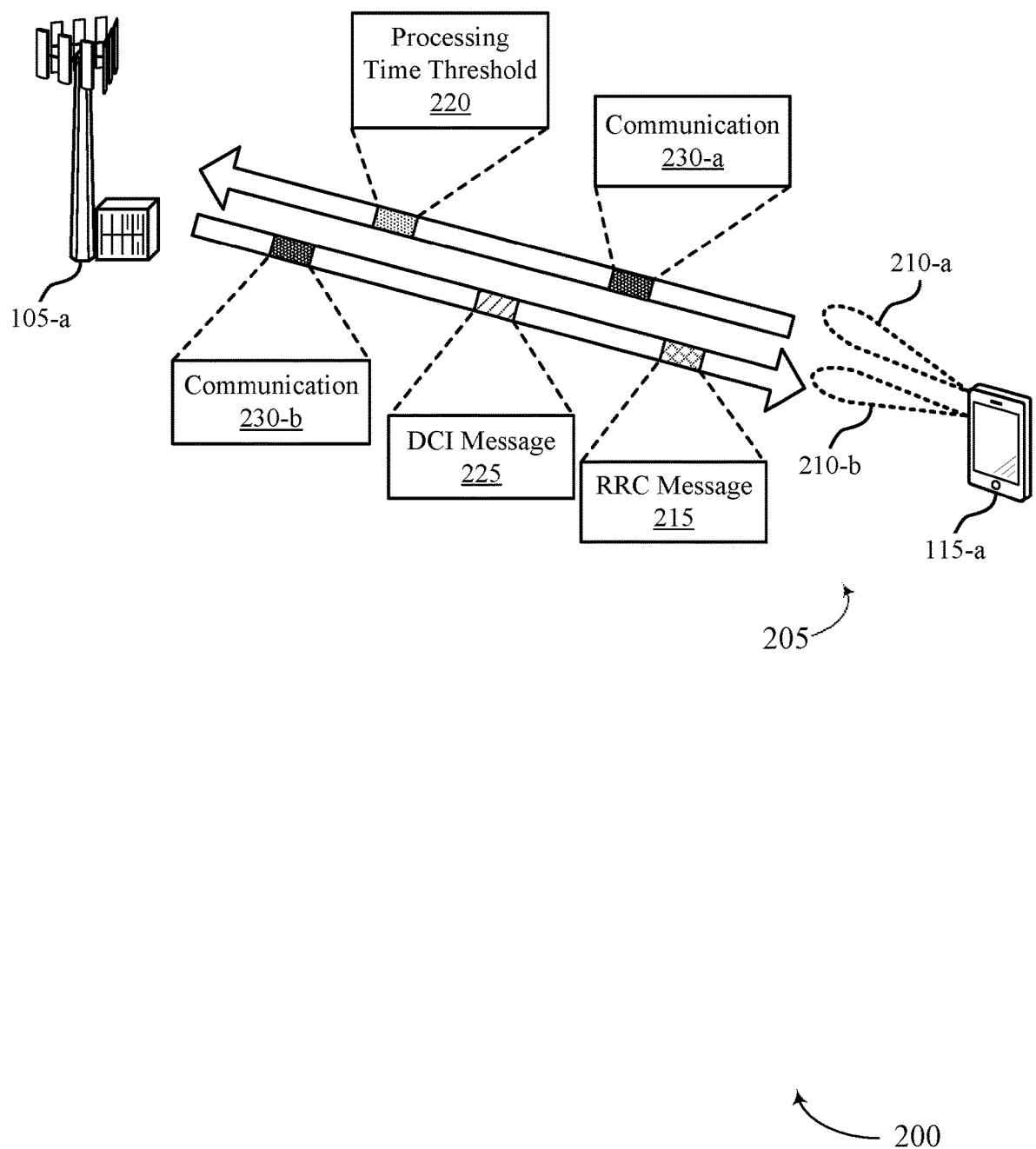
FIG. 2 illustrates an example of a wireless communications system that supports techniques for common beam update rules for scheduled communications in accordance with aspects of the present disclosure.

FIG. 2 illustrates an example of a wireless communications system 200 that supports techniques for common beam update rules for scheduled communications in accordance with aspects of the present disclosure. In some examples, wireless communications system 200 may implement, or be implemented by, aspects of wireless communications system 100. The wireless communications system 200 may include a UE 115-a and a base station 105-a, which may be examples of UEs 115 and base stations 105, as described with reference to FIG. 1.

In some aspects, the UE 115-a and the base station 105-a may communicate with one another via a communication link 205. In some aspects, the communication link 205 may include an example of an access link (e.g., Uu link). The communication link 205 may include a bi-directional link that can include both uplink and downlink communication. For example, the UE 115-a may transmit uplink transmissions, such as uplink control signals or uplink data signals, to the base station 105-a using the communication link 205, and the base station 105-a may transmit downlink transmissions, such as downlink control signals or downlink data signals, to the UE 115-a using the communication link 205. In some aspects, the wireless communications system 200 may support wireless communications with wireless devices (e.g., UE 115-a) via one or more serving cells of the wireless communications system 200. Each serving cell may be supported by one or more base stations 105 of the wireless communications system 200.

In some aspects, the UE 115-a and the base station 105-a may communicate with one another using one or more beams, one or more carriers, one or more communications links, or any combination thereof. In some aspects, the UE 115-a may communicate with the base station 105-a via one or more common beams 210. In some aspects, each common beam 210 may be associated with (e.g., used for) multiple channels, multiple reference signals, or both. For example, the UE 115-a may be configured to use the common beam 210-a for a downlink channel of the communication link 205 and an uplink channel of the communication link 205. By way of another example, the UE 115-a may be configured to use the common beam 210-a for multiple downlink channels of the communication link 205, multiple uplink channels of the communication link 205, or both. Furthermore, the UE 115-a may be configured to use the common beam 210-a for a first set of reference signals and a second set of reference signals.

In some aspects, the base station 105-a, the UE 115-a, or both, may perform directional beamforming for performing transmissions via the communication link 205. The UE 115-a may be configured to perform beam switching procedures to transition from one beam to another. For example, the UE 115-a may be configured to communicate using the first common beam 210-a, and may perform a beam switching procedure to transition from the first common beam 210-a to the second common beam 210-b in order to communicate according to the second common beam 210-b. Beam switching procedures may involve processing at the UE 115-a, retuning of radio frequency components, or both. In some cases, different beams (e.g., common beams 210) may be configured according to different parameters (e.g., different TCI states, transmission powers).

As noted previously herein, in some wireless communications systems, a single DCI message may only be capable of updating a single beam at a UE 115. In other wireless communications systems, a single DCI message may be configured to update multiple beams at a UE 115. In particular, a single DCI message may indicate a common TCI state which updates a common beam 210 at a UE 115. Enabling a single DCI message to update multiple beams (e.g., a common beam 210) at a UE 115 may reduce control signaling overhead within a wireless communications system. However, current wireless communications systems do not provide signaling or other rules which instruct a UE 115 as to when an update to a common beam should be implemented. As such, upon receiving a DCI message which schedules a transmission and indicates an update to a common beam, a UE 115 may not know when the update to the common beam should be implemented.

Accordingly, the wireless communications system 200 may support techniques for configuring and/or signaling beam update configurations which define a timing for updating common beams 210 at the UE 115-a. In particular, techniques described herein may define beam update configurations and signaling for beam update configurations which may improve the implementation of updates to a common beam 210 at the UE 115-a.

For example, the UE 115-a may receive an RRC message 215 from the base station 105-a. In some aspects, the RRC message 215 may indicate one or more beam update configurations for updating common beams 210 configured for wireless communications at and/or with the UE 115-a. In this regard, the RRC message 215 may configure the UE 115-a with a set of beam update configurations which may be used to update common beams 210. Each of the beam update configurations may define a timing for updating a common beam 210 for communications at or with the UE 115-a. In particular, each beam update configuration may define a timing for updating a common beam 210 at the UE 115-a in relation to a communication 230 and in response to a DCI message 225 that schedules the communication 230 and indicates an update to the common beam 210. As noted previously herein, a common beam 210 at the UE 115-a which may be updated according to one or more of the beam update configurations may be shared across a set of channels (e.g., downlink and uplink channel, multiple downlink channels, multiple uplink channels), a set of reference signals, or both. Thus, common beams 210 may include downlink beams used to receive downlink transmissions, uplink beams used to transmit uplink transmissions, or both. Various beam update configurations will be described in further detail herein with respect to FIGS. 3 and 4.

In some aspects, UE 115-a may transmit an indication of a processing time threshold 220 (e.g., processing timeline) associated with the UE 115-a. The UE 115-a may transmit the indication of the processing time threshold 220 based on receiving the RRC message 215. In some aspects, the processing time threshold 220 may be associated with a processing timeline for processing communications at the UE 115-a, performing beam switching procedures, or both. For example, the processing time threshold 220 at the UE 115-a may be based on a first time duration associated with downlink control channel processing (e.g., PDCCH processing) at the UE 115-a, a second time duration associated with retuning radio frequency components at the UE 115-a, or both. For instance, the processing time threshold 220 may be based on a duration of time required for the UE 115-a to decode DCI messages 225. In this regard, the processing time threshold 220 may be associated with a duration of time between a first time when the UE 115-a receives a grant (e.g., DCI message 225), and a second time at which the UE 115-a is capable of acting in accordance with the grant. Thus, the processing time threshold 220 may be defined by a quantity of slots, a quantity of symbols, and the like. In some cases, processing time threshold 220 may include a K0 value, a K1 value, a K2 value, or any combination thereof.

The UE 115-a may receive a DCI message 225 from the base station 105-a. In some aspects, the UE 115-a may receive the DCI message 225 using the first common beam 210-b. The UE 115-a may receive (and the base station 105-a may transmit) the DCI message 225 based on transmitting/receiving the RRC message 215, transmitting/receiving the processing time threshold 220, or both. The DCI message 225 may be transmitted via Layer 1 (L1) signaling. Additionally, the DCI message 225 may include a unicast transmission, and may include any number of formats for DCI messages (e.g., DCI 1_1, DCI 1_2).

In some aspects, the DCI message 225 may indicate an update to a common beam 210 which is to be performed at the UE 115-*a*. In this regard, the DCI message 225 may indicate that the UE 115-*a* is to perform a beam switching procedure to update the first common beam 210-*a* to the second common beam 210-*b*. For example, the DCI message 225 may indicate a common TCI state for updating the first common beam 210-*a* for communications with the UE 115-*a*. A TCI state may include at least one source reference signal to provide a reference for the UE 115-*a* to determine a QCL configuration and/or spatial filter for updating the common beam 210-*a*. The common beam 210 which is to be updated in accordance with the DCI message 225 may be shared across multiple channels, multiple reference signals, or both.

Moreover, the common beam 210 may be associated with transmissions carried out via a single TRP of the UE 115-*a* and/or base station 105-*a*, multiple TRPs of the UE 115-*a* and/or base station 105-*a*, a single CORESET, multiple CORESETs, or any combination thereof. For example, the common beam 210 may be shared across a downlink channel and an uplink channel, multiple downlink channels, multiple uplink channels, multiple reference signals, or any combination thereof.

For instance, the DCI message 225 may indicate a joint uplink/downlink common TCI state configured to update a common beam 210 shared across a downlink channel and an uplink channel, shared across two reference signals, or both. Additionally, the DCI message 225 may indicate a separate downlink-common TCI state configured to update a common beam 210 shared across two downlink channels, shared across two reference signals, or both. For example, the common beam 210 may be shared across a PDSCH channel and a PDCCH channel. Similarly, the DCI message 225 may indicate a separate uplink-common TCI state configured to update a common beam 210 shared across two uplink channels, shared across two reference signals, or both.

In some aspects, source reference signals associated with downlink-common TCI states may provide QCL information for reception of downlink transmissions (e.g., PDSCH transmissions) at the UE 115-*a*, which may be applied for downlink reception on all or a subset of CORESETs within a component carrier. Similarly, source reference signals associated with uplink-common TCI states may provide a reference for determining common uplink transmission spatial filters for grants (e.g., dynamic grants, configured grants) based on uplink transmissions (e.g., PUSCH transmissions) at the UE 115-*a*, which may be applied for uplink transmission on all or a subset of PUCCH resources within a component carrier. In some cases, uplink transmission spatial filters associated with uplink-common TCI states may also apply to all or a subset of sounding reference signal (SRS) resources in a resource set which are configured for antenna switching and/or uplink transmissions (e.g., codebook-based uplink transmissions, non-codebook-based uplink transmissions). In some cases, MAC-control element (MAC-CE) messages may additionally or alternatively be used to activate one or more TCI states.

Additionally, or alternatively, the DCI message 225 may schedule a communication 230 (e.g., PDSCH transmission, PUCCH transmission, PUSCH transmission) between the base station 105-*a* and the UE 115-*a*. In some aspects, the timing of the communication 230 scheduled by the DCI message 225 may be based on the processing time threshold 220 at the UE 115-*a*. In particular, the base station 105-*a* may schedule the communication 230 via the DCI message 225 in accordance with the processing time threshold 220 based on which common beam 210 should be used to perform the communication 230. In this regard, the base station 105-*a* may schedule the communication 230 via the DCI message 225 in order to ensure that the UE 115-*a* does (or does not) have sufficient time to perform the update to the common beam 210 prior to the communication 230. For instance, the base station 105-*a* may schedule the communication 230 via the DCI message 225 prior to the processing time threshold 220 so that the UE 115-*a* does not have sufficient time to perform the update to the common beam 210 prior to the communication 230. As such, the base station 105-*a* may be able to control or influence which common beam 210 (e.g., first common beam 210-*a*, second common beam 210-*b*) is used at the UE 115-*a* to perform the scheduled communication 230 based on a relative timing of the communication 230 with respect to the DCI message 225.

In some cases, the UE 115-*a* may transmit one or more feedback messages to the base station 105-*a* based on (e.g., in response to) the DCI message 225. For example, the UE 115-*a* may transmit an acknowledgement (ACK) message in cases where the UE 115-*a* successfully receives and/or decodes the DCI message 225. Conversely, the UE 115-*a* may transmit a negative acknowledgement (NACK) message in cases where the UE 115-*a* does not successfully receive and/or decode the DCI message 225. In such cases, the NACK may serve as a request for the base station 105-*a* to re-transmit the DCI message 225.

The UE 115-*a*, the base station 105-*a*, or both, may identify which beam update configuration is to be used to implement the update to the common beam 210. The UE 115-*a* and/or the base station 105-*a* may determine which beam update configuration is to be used based on transmitting/receiving the RRC message 215, transmitting/receiving the processing time threshold 220, transmitting/receiving the DCI message 225, transmitting/receiving additional or alternative control signaling, or any combination thereof.

In some cases, the DCI message 225 may dynamically indicate a beam update configuration which is to be used to update the common beam 210 indicated by the DCI message 225. For example, in some cases, the beam update configuration which is to be used for implementing the update to the common beam 210 may be indicated dynamically via the DCI message 225 (e.g., without any pre-configuration at the UE 115-*a* or signaling from the base station 105-*a*). In such cases, the DCI message 225 may include an indication of the beam update configuration which is to be used.

In other cases, the UE 115-*b* may be pre-configured (e.g., via the RRC message 215) with a beam update configuration which is to be used. In additional or alternative cases, the beam update configuration which is to be used may be signaled via a combination of the RRC message 215 and the DCI message 225. For example, the RRC message 215 may configure the UE 115-*a* with a set of beam update configurations which may be used. Subsequently, the DCI message 225 may indicate which beam update configuration of the set of beam update configurations is to be used.

The relative timing for implementing the update to the common beam 210 may change depending on the beam update configuration which is to be used. For example, according to one beam update configuration, the UE 115-*a* may be configured to update the common beam 210 after performance of the communication 230 scheduled by the DCI message 225. According to this beam update configuration, the UE 115-*a* may always update the common beam 210 after the scheduled communication 230 regardless of whether the processing time threshold 220 is satisfied at the UE 115-*b*. Accordingly, according to this beam update configuration, the UE 115-*a* may perform the communication 230 scheduled by the DCI message 225, and may perform a beam switching procedure to update the first common beam 210-*a* to the second common beam 210-*b* (e.g., updated common beam 210-*b*) after performance of the communication 230. As such, the UE 115-*a* may perform additional communications in accordance with the updated common beam 210-*b*. Details of this beam update configuration will be described in further detail with respect to FIG. 4.

According to another beam update configuration, the relative timing of the update to the common beam 210 may be based on the processing time threshold 220. In particular, the timing for the update to the common beam 210 may be based on a comparison of the processing time threshold 220 and a time interval between the DCI message 225 and the scheduled communication 230.

According to this beam update configuration, the UE 115-*a*, the base station 105-*a*, or both, may identify a time interval between transmission/reception of the DCI message 225 and the scheduled communication 230. For example, the UE 115-*a* may identify a time interval between reception of the DCI message 225 and a time at which the scheduled communication 230 is to be performed (e.g., a time at which the scheduled communication 230 is to be transmitted or received). As such, the UE 115-*a* and/or the base station 105-*a* may identify the time interval based on transmitting/receiving the RRC message 215, transmitting/receiving the processing time threshold 220, transmitting/receiving the DCI message 225, identifying the beam update configuration, identifying a time at which the communication 230 scheduled by the DCI message 225 is to be performed, or any combination thereof. The time interval may include a quantity of slots, a quantity of symbols, and the like.

Subsequently, the UE 115-*a*, the base station 105-*a*, or both, may compare the time interval with the processing timeline (e.g., processing threshold) at the UE 115-*a*. In some aspects, the UE 115-*a* and/or the base station may perform the comparison based on transmitting/receiving the RRC message 215, transmitting/receiving the processing time threshold 220, transmitting/receiving the DCI message 225, identifying the beam update configuration, identifying a time at which the communication 230 scheduled by the DCI message 225 is to be performed, identifying the time interval, or any combination thereof.

As noted previously herein, the time interval may define a time duration between the DCI message 225 and the communication 230 scheduled by the DCI message 225. Similarly, the time interval may define a time duration between the DCI message 225 and a time at which the UE 115-*a* is capable of acting in accordance with the DCI message 225 (e.g., performing the communication 230 scheduled by the DCI message 225). As such, in some cases, both the time interval and the processing time threshold 220 may be based on a time at which the DCI message 225 was transmitted/received. However, the time duration, the processing time threshold 220, and/or other time durations (e.g., minimum beam indication delay) may be measured and/or initiated relative to additional or alternative points in time, such as a time at which DCI message 225 was acknowledged (e.g., time of ACK/NACK responsive to DCI message 225). Minimum beam indication delays may exhibit one or more values (e.g., 0.5 ms, 2 ms, 3 ms).

According to some beam update configurations, the relative timing of the update to the common beam 210 may be based on the comparison of the time interval ($T_{Int}$) and the processing time threshold 220 ($PT_{Thresh}$). In particular, the relative timing of the update to the common beam 210 may be based on whether or not the time interval satisfies the processing time threshold 220. In some aspects, the time interval may satisfy the processing time threshold 220 if the time interval is greater than or equal to the processing threshold (e.g., processing timeline satisfied if $T_{Int} \geq PT_{Thresh}$). In this regard, the communication 230 scheduled by the DCI message 225 may be scheduled after an end of the processing time threshold 220, thereby satisfying the processing time threshold 220 and providing the UE 115-*a* with sufficient time to process the DCI message 225 and perform the beam switching procedure (e.g., radio frequency component retuning).

Conversely, the time interval may fail to satisfy the processing time threshold 220 if the time interval is less than the processing time threshold 220 (e.g., processing timeline not satisfied if $T_{Int} < PT_{Thresh}$). In this regard, the communication 230 scheduled by the DCI message 225 may be scheduled before an end of the processing time threshold 220, thereby failing to satisfy the processing time threshold 220 due to the fact that the UE 115-*a* may not have sufficient time to process the DCI message 225 and perform the beam switching procedure (e.g., radio frequency component retuning).

Accordingly, in some aspects, the UE 115-*a* may be configured to perform at least one beam switching procedure after performance of the communication 230 scheduled by the DCI message 225 if the time interval fails to satisfy the processing time threshold 220 (e.g., update common beam 210 after scheduled communication 230 if $T_{Int} < PT_{Thresh}$). Conversely, the UE 115-*a* may be configured to perform at least one beam switching procedure prior to performance of the communication 230 scheduled by the DCI message 225 if the time interval satisfies the processing time threshold 220 (e.g., update common beam 210 before scheduled communication 230 if $T_{Int} \geq PT_{Thresh}$).

In some aspects, the UE 115-*a* may perform at least one beam switching procedure to update the common beam 210 (e.g., update the first common beam 210-*a* to the second/ updated common beam 210-*b*). In some aspects, the UE 115-*a* may perform the at least one beam switching procedure based on the DCI message 225 and in accordance with the beam update configuration. In this regard, the UE 115-*a* may update the common beam 210 based on receiving the RRC message 215, transmitting the processing time threshold 220, receiving the DCI message 225, identifying the beam update configuration, identifying the time interval, comparing the time interval and the processing time threshold 220, or any combination thereof. For example, the UE 115-*a* may perform the at least one beam switching procedure based on (e.g., in accordance with) a common TCI state indicated in the DCI message 225.

For example, according to some beam update configurations, the UE 115-*a* may perform the beam switching procedure to update the first common beam 210-*a* to the second common beam 210-*b* prior to performing the communication 230 scheduled by the DCI message 225 based on the comparison of the time interval and the processing time threshold 220. In particular, according to some beam update configurations, the UE 115-*a* may perform the beam switching procedure to update the first common beam 210-*a* to the second common beam 210-*b* prior to performing the communication 230 scheduled by the DCI message 225 if the time interval satisfies the processing time threshold 220 (e.g., update common beam 210 before scheduled communication 230 if $T_{Int} \geq PT_{Thresh}$).

Continuing with the example above, the UE 115-*a* may perform the communication 230 scheduled by the DCI message 225. The communication 230 may include a PDSCH transmission, a PUCCH transmission, a PUSCH transmission, or any combination thereof. In some aspects, the UE 115-a may perform the communication 230 scheduled by the DCI message 225 based on performing the at least one beam switching procedure. In this regard, the UE 115-a may perform the communication 230 scheduled by the DCI message 225 using the updated common beam 210-b. For example, in cases where the time interval satisfies the processing time threshold 220 (e.g., $T_{Int} \geq PT_{Thresh}$), the UE 115-a may update the common beam 210, and may perform the communication 230 using the updated common beam 210-b.

For instance, in cases where the DCI message 225 schedules an uplink communication 230-a, and the UE 115-a updates the first common beam 210-a to the second common beam 210-b prior to performing the uplink communication 230-a, the UE 115-a may perform the uplink communication 230-a using the second common beam 210-b. By way of another example, in cases where the DCI message 225 schedules a downlink communication 230-b, and the UE 115-a updates the first common beam 210-a to the second common beam 210-b prior to performing the downlink communication 230-b, the UE 115-a may perform the downlink communication 230-b using the second common beam 210-b.

In additional or alternative cases, the UE 115-a may not perform the beam switching procedure prior to performing the communication 230. For example, cases where the time interval fails to satisfy the processing time threshold 220 (e.g., $T_{Int} < PT_{Thresh}$), the UE 115-a may refrain from performing the beam switching procedure prior to performance of the scheduled communication 230. In such cases, the UE 115-a may perform the communication 230 using the same common beam 210 (e.g., first common beam 210-a) which was used to receive the DCI message 225.

Thus, in cases where the UE 115-a refrains from performing the beam switching procedure prior to performing the communication 230, the UE 115-a may perform at least one beam switching procedure to update the first common beam 210-a to the second common beam 210-b after performance of the scheduled communication 230. The UE 115-a may perform the at least one beam switching procedure based on the DCI message 225 and in accordance with the beam update configuration. In this regard, the UE 115-a may update the common beam 210 based on receiving the RRC message 215, transmitting the processing time threshold 220, receiving the DCI message 225, identifying the beam update configuration, identifying the time interval, comparing the time interval and the processing time threshold 220, performing the scheduled communication 230, or any combination thereof. Moreover, the UE 115-a may perform the beam switching procedure after performance of the communication 230 based on refraining from performing the beam switching procedure prior to performance of the scheduled communication 230.

For example, according to some beam update configurations, the UE 115-a may perform the beam switching procedure to update the first common beam 210-a to the second common beam 210-b after performing the communication 230 scheduled by the DCI message 225 based on the comparison of the time interval and the processing time threshold 220. In particular, according to some beam update configurations, the UE 115-a may perform the beam switching procedure to update the common beam 210 after performing the communication 230 scheduled by the DCI message 225 if the time interval fails to satisfy the processing time threshold 220 (e.g., update common beam 210 after scheduled communication 230 if $T_{Int} < PT_{Thresh}$). By performing the beam switching procedure after performance of the communication 230, the UE 115-a may be configured to perform the communication 230 with the same common beam 210 (e.g., first common beam 210-a) which was used to receive the DCI message 225.

In some cases, the UE 115-a may perform additional communications (e.g., PDCCH transmissions, PDSCH transmissions, PUCCH transmissions, PUSCH transmissions) with the base station 105-a. In some aspects, the UE 115-a may perform the additional communications with the base station 105-a based on performing the at least one beam switching procedure before and/or after the scheduled communication 230. In this regard, the UE 115-a may perform the additional communications using the updated common beam 210-b which was generated based on the beam switching procedure(s).

The techniques described herein may provide signaling and other configurations which indicate when the UE 115-a should implement updates to common beams 210. As such, the techniques described herein may enable the base station 105-a to update multiple beams (e.g., a common beam 210) at the UE 115-a using a single DCI message 225. In this regard, techniques described herein may thereby reduce control signaling overhead and improve resource utilization in the wireless communications system. Moreover, by providing beam update configurations which define timings for implementing updates to common beams 210, techniques described herein may improve the speed and efficiency with which beams may be updated at the UE 115-a, thereby improving the efficiency of wireless communications within the wireless communications system.

Figure 3:
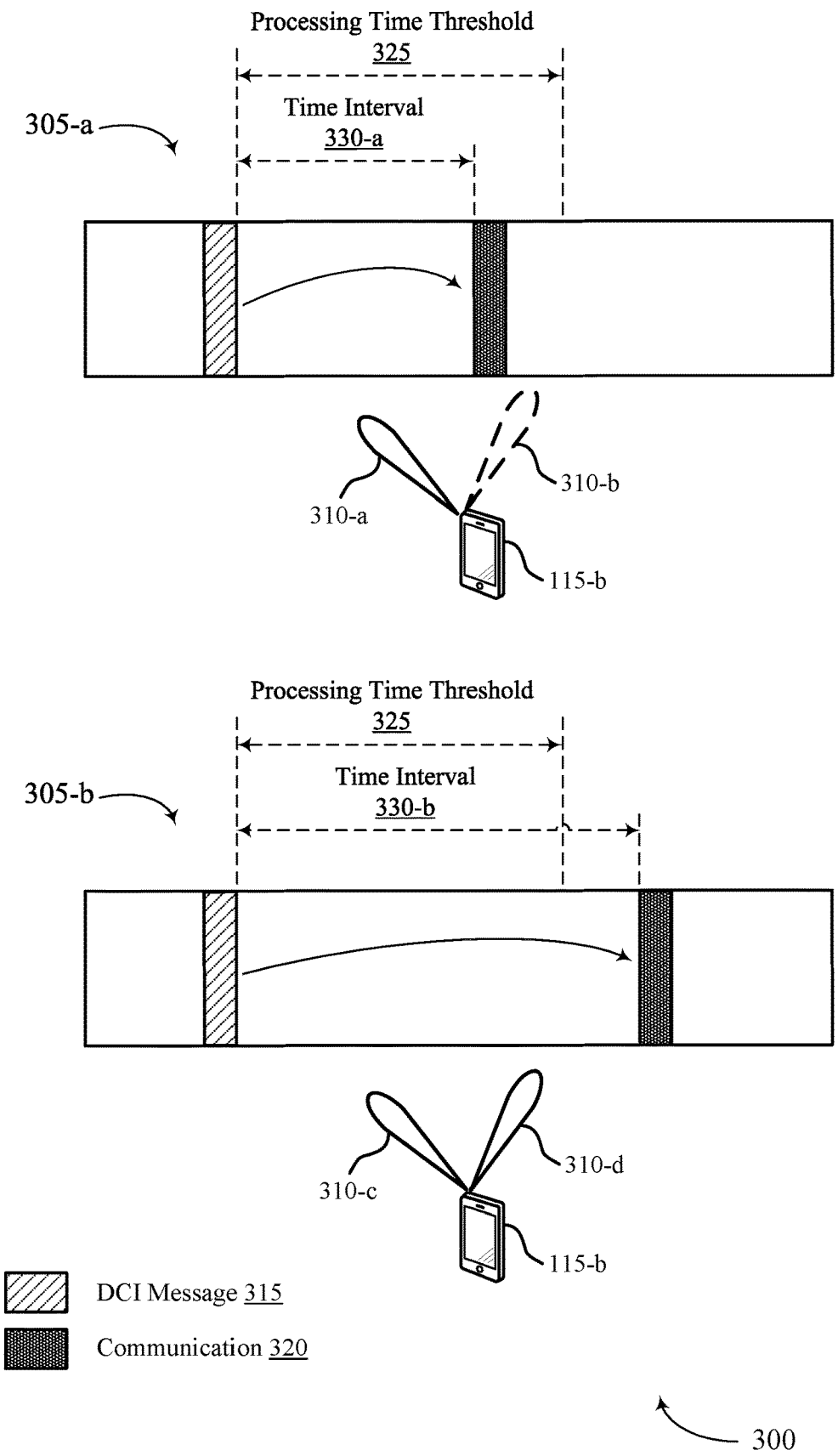
FIG. 3 illustrates an example of a beam update configuration that supports techniques for common beam update rules for scheduled communications in accordance with aspects of the present disclosure.

FIG. 3 illustrates an example of a beam update configuration 300 that supports techniques for common beam update rules for scheduled communications in accordance with aspects of the present disclosure. In some examples, the beam update configuration 300 may implement, or be implemented by, aspects of wireless communications system 100, wireless communications system 200, or both. In some aspects, the beam update configuration 300 illustrates a first beam update configuration which may be signaled and/or configured at a UE 115 to specify a timing of implementing a common beam update at the UE 115.

According to the beam update configuration 300, the timing of an update to a common beam 310 for communications with a UE 115-b may be based on a comparison of a processing time threshold 325 associated with the UE 115-b and a time interval 330 between a DCI message 315 and a communication 320 scheduled by the DCI message 315. In particular, the timing of the update to the common beam 310 may be dependent on whether or not the time interval 330 satisfies the processing time threshold 325.

In some aspects, the time interval 330 may satisfy the processing time threshold 325 if the time interval 330 is greater than or equal to the processing time threshold 325 (e.g., processing timeline satisfied if $T_{Int} \geq PT_{Thresh}$). Conversely, the time interval 330 may fail to satisfy the processing time threshold 325 if the time interval 330 is less than the processing time threshold 325 (e.g., processing timeline not satisfied if $T_{Int} < PT_{Thresh}$). The relative timing of an update to the common beam 310 based on whether or not the processing time threshold is satisfied is illustrated in timing schemes 305-a and 305-b.

Referring to timing scheme 305-a, a UE 115-b may receive a DCI message 315 from a base station 105 which schedules a communication 320 between the base station 105 and the UE 115-b. The UE 115-b may receive the DCI message 315 via a first common beam 310-a. In some aspects, the DCI message 315 may additionally indicate a common update to the common beam 310-a for communications at and/or with the UE 115-a, where the common beam 310-a is shared across a set of channels, a set of reference signals, or both. Upon receiving the DCI message 315, the UE 115-b may determine the beam update configuration (e.g., beam update configuration 300) which is to be used to implement the update to the common beam 310-a. The beam update configuration 300 may be indicated to the UE 115-b via the DCI message 315, via RRC signaling, via other control signaling, or any combination thereof.

In some aspects, and in accordance with the determined beam update configuration 300, the UE 115-b may determine a time interval 330-a between reception of the DCI message 315 and the scheduled communication 320. The UE 115-b may then compare the time interval 330-a to the processing time threshold 325 associated with the UE 115-b. In this example, the UE 115-b may determine that the time interval 330-a fails to satisfy the processing time threshold 325 due to the fact that the time interval 330-a is less than the processing time threshold 325 (e.g., processing timeline not satisfied because $T_{Int}<PT_{Thresh}$). The time interval 330-a failing to satisfy the processing time threshold 325 may indicate that the UE 115-b does not have sufficient time to process the DCI message 315 and/or perform beam switching procedures (e.g., retune radio frequency components) prior to performance of the communication 320.

Accordingly, as shown in the timing scheme 305-a, the UE 115-b may perform the communication 320 scheduled by the DCI message 315, and may perform one or more beam switching procedures to update the common beam 310-a after performance of the communication 320. In this regard, the UE 115-b may perform the communication 320 using the first common beam 310-a which was used to receive the DCI message 315, and may perform subsequent transmissions using the updated common beam 310-b.

Comparatively, referring to timing scheme 305-b, the UE 115-b may determine that a time interval 330-b satisfies the processing time threshold 325 due to the fact that the time interval 330-b is greater than (or equal to) the processing time threshold 325 (e.g., processing timeline satisfied because $T_{Int} \geq PT_{Thresh}$). The time interval 330-b satisfying the processing time threshold 325 may indicate that the UE 115-b has sufficient time to process the DCI message 315 and/or perform beam switching procedures (e.g., retune radio frequency components) prior to performance of the communication 320.

Accordingly, as shown in the timing scheme 305-b, the UE 115-b may perform one or more beam switching procedures to update the common beam 310-c prior to performance of the communication 320. In this regard, the UE 115-b may update the first common beam 310-c to the second common beam 310-d (e.g., updated common beam 310-d), and may perform the communication 320 using the updated common beam 310-d.

Figure 4:
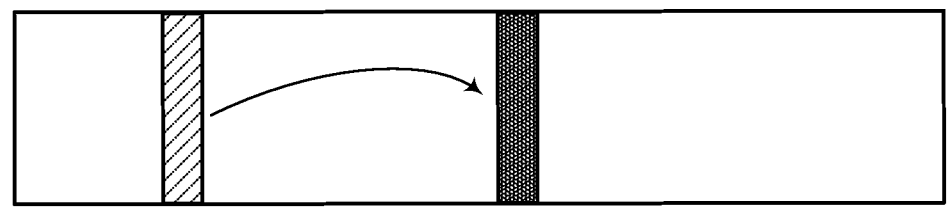
FIG. 4 illustrates an example of a beam update configuration that supports techniques for common beam update rules for scheduled communications in accordance with aspects of the present disclosure.
Figure 4:
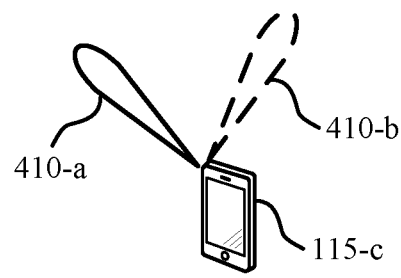
Figure 4:
Figure 4:

FIG. 4 illustrates an example of a beam update configuration 400 that supports techniques for common beam update rules for scheduled communications in accordance with aspects of the present disclosure. In some examples, the beam update configuration 400 may implement, or be implemented by, aspects of wireless communications system 100, wireless communications system 200, or both. In some aspects, the beam update configuration 400 illustrates a second beam update configuration which may be signaled and/or configured at a UE 115-c to specify a timing of implementing a common beam update at the UE 115-c.

According to the beam update configuration 400, an update to a common beam 410 for communications at and/or with the UE 115-c may be performed after performance of a communication 420 scheduled by a DCI message 415, regardless as to whether or not a processing time threshold (e.g., processing time threshold 325) at the UE 115-c is satisfied. In this regard, as compared to the beam update configuration 300 in which the timing of the update to the common beam 310 was based on the processing time threshold 325 and the time interval, the update to the common beam 410 according to the beam update configuration 400 may always be performed after the scheduled communication 420.

For example, as shown in timing scheme 405, a UE 115-c may receive a DCI message 415 from a base station 105 which schedules a communication 420 between the base station 105 and the UE 115-c. The UE 115-c may receive the DCI message 415 via a first common beam 410-a. In some aspects, the DCI message 415 may additionally indicate a common update to the common beam 410-a for communications with the UE 115-c, where the common beam 410-a is shared across a set of channels, a set of reference signals, or both. Upon receiving the DCI message 415, the UE 115-c may determine the beam update configuration (e.g., beam update configuration 400) which is to be used to implement the update to the common beam 410-a. The beam update configuration 400 may be indicated to the UE 115-c via the DCI message 415, via RRC signaling, via other control signaling, or any combination thereof.

In some aspects, and in accordance with the determined beam update configuration 400, the UE 115-c may perform the communication 420 scheduled by the DCI message 415, and may perform one or more beam switching procedures after performance of the communication 420 to update the first common beam 410-a to the second common beam 410-b. In this regard, the UE 115-c may perform the communication 420 using the first common beam 410-a which was used to receive the DCI message 415, and may perform subsequent transmissions using the updated common beam 410-b.

Figure 5:
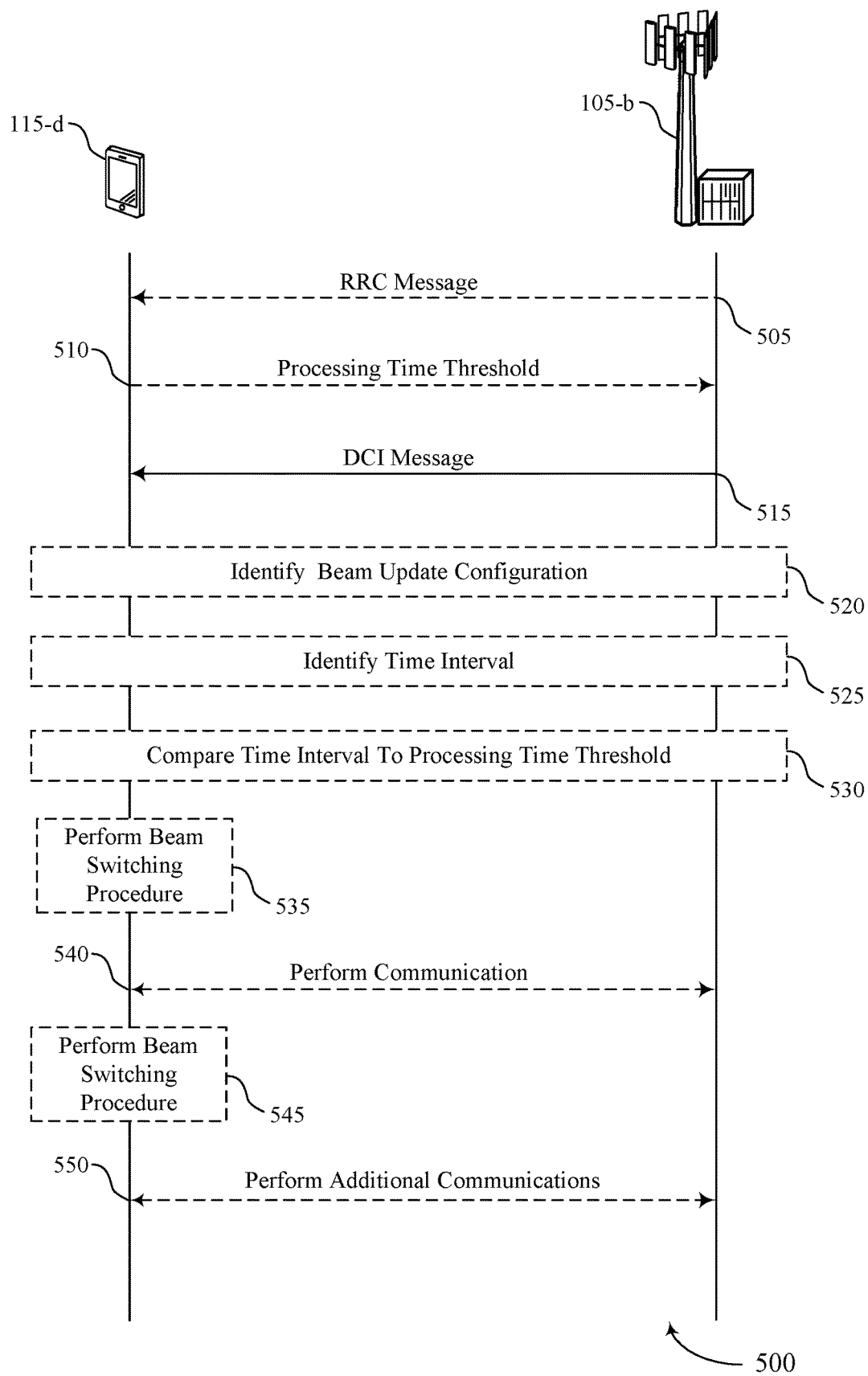
FIG. 5 illustrates an example of a process flow that supports techniques for common beam update rules for scheduled communications in accordance with aspects of the present disclosure.

FIG. 5 illustrates an example of a process flow 500 that supports techniques for common beam update rules for scheduled communications in accordance with aspects of the present disclosure. In some examples, process flow 500 may implement, or be implemented by, aspects of wireless communications system 100, wireless communications system 200, beam update configuration 300, beam update configuration 400, or any combination thereof. For example, the process flow 500 may illustrate a UE 115-d receiving control signaling indicating one or more beam update configurations, receiving a DCI message which indicates an update to a common beam, and implementing the update to the common beam in accordance with the beam update configuration, as described with reference to FIGS. 1-4, among other aspects.

In some aspects, the process flow 500 may include a UE 115-d and a base station 105-b, which may include examples of UEs 115 and base stations 105 as described with reference to FIGS. 1-4. For example, the UE 115-d illustrated in FIG. 5 may be an example of the UE 115-a illustrated in FIG. 2, and the base station 105-b illustrated in FIG. 5 may be an example of the base station 105-a illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-d may receive an RRC message from the base station 105-b. In some aspects, the RRC message may indicate one or more beam update configurations for updating common beams for communications at/with the UE 115-d. In this regard, the RRC message may configure the UE 115-d with a set of beam update configurations which may be used to update common beams for communications with the UE 115-d. Each of the beam update configurations may define a timing for updating a common beam. In particular, each beam update configuration may define a timing for updating a common beam for communications with the UE 115-d in relation to a transmission and in response to a DCI message that schedules the transmission and indicates an update to the common beam. As noted previously herein, a common beam at the UE 115-d which may be updated according to one or more of the beam update configurations may be shared across a set of channels (e.g., downlink and uplink channel, multiple downlink channels, multiple uplink channels), a set of reference signals, or both.

At 510, the UE 115-d may transmit an indication of a processing time threshold (e.g., processing timeline) associated with the UE 115-d. The UE 115-d may transmit the indication of the processing time threshold based on receiving the RRC message at 505. In some aspects, the processing time threshold may be associated with a processing timeline for processing transmissions at the UE 115-d, performing beam switching procedures, or both. For example, the processing time threshold at the UE 115-d may be based on a first time duration associated with downlink control channel processing (e.g., PDCCH processing) at the UE 115-d, a second time duration associated with retuning radio frequency components at the UE 115-d, or both. For instance, the processing time threshold may be based on a duration of time required for the UE 115-d to decode DCI messages. In this regard, the processing time threshold may be associated with a duration of time between a first time when the UE 115-d receives a grant (e.g., DCI message), and a second time at which the UE 115-d is capable of acting in accordance with the grant. Thus, the processing time threshold may be defined by a quantity of slots, a quantity of symbols, and the like. In some cases, processing time threshold may include a K0 value, a K1 value, a K2 value, or any combination thereof.

At 515, the UE 115-d may receive a DCI message from the base station 105-b. The UE 115-d may receive (and the base station 105-b may transmit) the DCI message at 515 based on transmitting/receiving the RRC message at 505, transmitting/receiving the processing time threshold at 510, or both. The DCI message may be transmitted via L1 signaling. Additionally, the DCI message may include a unicast transmission, and may include any number of formats for DCI messages (e.g., DCI 1_1, DCI 1_2).

In some aspects, the DCI message may indicate an update to a common beam which is to be performed at the UE 115-d. For example, the DCI message may indicate a common TCI state for updating the common beam for communications with the UE 115-d. A TCI state may include at least one source reference signal to provide a reference for the UE 115-d to determine a QCL configuration and/or spatial filter for updating the common beam. The common beam which is to be updated in accordance with the DCI message may be shared across multiple channels, multiple reference signals, or both.

For instance, the DCI message may indicate a joint uplink/downlink common TCI state configured to update a common beam shared across a downlink channel and an uplink channel, shared across two reference signals, or both. Additionally, the DCI message may indicate a separate downlink-common TCI state configured to update a common beam shared across two downlink channels, shared across two reference signals, or both. Similarly, the DCI message may indicate a separate uplink-common TCI state configured to update a common beam shared across two uplink channels, shared across two reference signals, or both.

Additionally, or alternatively, the DCI message may schedule a communication (e.g., PDSCH transmission, PUCCH transmission, PUSCH transmission) between the base station 105-b and the UE 115-d. In some aspects, the timing of the communication scheduled by the DCI message may be based on the processing time threshold at the UE 115-d. In particular, the base station 105-b may schedule the communication via the DCI message in accordance with the processing time threshold based on which common beam should be used at the UE 115-d to perform the communication. In this regard, the base station 105-b may schedule the communication via the DCI message in order to ensure that the UE 115-d does (or does not) have sufficient time to perform the update to the common beam prior to the communication.

For instance, the base station 105-b may schedule the communication via the DCI message prior to the processing time threshold so that the UE 115-d does not have sufficient time to perform the update to the common beam prior to the communication. As such, the base station 105-b may be able to control or influence which common beams are used for communications with the UE 115-d to perform the scheduled transmission based on a relative timing of the communication with respect to the DCI message.

At 520, the UE 115-d, the base station 105-b, or both, may identify which beam update configuration is to be used to implement the update to the common beam. The UE 115-d and/or the base station 105-b may determine which beam update configuration is to be used based on transmitting/receiving the RRC message at 505, transmitting/receiving the processing time threshold at 510, transmitting/receiving the DCI message at 515, additional or alternative control signaling, or any combination thereof.

In some cases, the DCI message may dynamically indicate a beam update configuration which is to be used to update the common beam indicated by the DCI message. For example, in some cases, the beam update configuration which is to be used for implementing the update to the common beam may be indicated dynamically via the DCI message (e.g., without any pre-configuration at the UE 115-d or signaling from the base station 105-b). In such cases, the DCI message may include an indication of the beam update configuration which is to be used.

In other cases, the UE 115-b may be pre-configured (e.g., via the RRC message at 505) with a beam update configuration which is to be used. In additional or alternative cases, the beam update configuration which is to be used may be signaled via a combination of the RRC message and the DCI message. For example, the RRC message may configure the UE 115-d with a set of beam update configurations which may be used. Subsequently, the DCI message may indicate which beam update configuration of the set of beam update configurations is to be used.

The relative timing for implementing the update to the common beam may change depending on the beam update configuration which is to be used. For example, according to one beam update configuration, the UE 115-d may be configured to update the common beam after performance of the communication scheduled by the DCI message. According to this beam update configuration, the UE 115-d may always update the common beam after the scheduled communication regardless of whether the processing time threshold is satisfied at the UE 115-b. Accordingly, according to this beam update configuration, the process flow 500 may proceed from 520 to 540, 545, and 550, in which the UE 115-d performs the communication scheduled by the DCI message, performs a beam switching procedure to update the common beam after performance of the communication, and performs additional communication in accordance with the updated common beam. These steps will be described in further detail herein.

According to another beam update configuration, the relative timing of the update to the common beam may be based on the processing time threshold. In particular, the timing for the update to the common beam may be based on a comparison of the processing time threshold and a time interval between the DCI message and the scheduled communication. In such cases, the process flow 500 may proceed to 525.

At 525, the UE 115-d, the base station 105-b, or both, may identify a time interval between transmission/reception of the DCI message and the scheduled communication. For example, the UE 115-d may identify a time interval between reception of the DCI message and a time at which the scheduled communication is to be performed (e.g., a time at which the scheduled communication is to be transmitted or received). As such, the UE 115-d and/or the base station may identify the time interval at 525 based on transmitting/receiving the RRC message at 505, transmitting/receiving the processing time threshold at 510, transmitting/receiving the DCI message at 515, identifying the beam update configuration at 520, identifying a time at which the communication scheduled by the DCI message is to be performed, or any combination thereof. The time interval may include a quantity of slots, a quantity of symbols, and the like.

At 530, the UE 115-d, the base station 105-b, or both, may compare the time interval with the processing timeline (e.g., processing time threshold) at the UE 115-d. In some aspects, the UE 115-d and/or the base station may perform the comparison at 530 based on transmitting/receiving the RRC message at 505, transmitting/receiving the processing time threshold at 510, transmitting/receiving the DCI message at 515, identifying the beam update configuration at 520, identifying a time at which the communication scheduled by the DCI message is to be performed, identifying the time interval at 525, or any combination thereof.

As noted previously herein, the time interval may define a time duration between the DCI message and the communication scheduled by the DCI message. Similarly, the time interval may define a time duration between the DCI message and a time at which the UE 115-d is capable of acting in accordance with the DCI message (e.g., performing the transmission scheduled by the DCI message). As such, in some cases, both the time interval and the processing time threshold may be based on a time at which the DCI message was transmitted/received. However, the time duration, the processing time threshold, and/or other time durations (e.g., minimum beam indication delay) may be measured and/or initiated relative to additional or alternative points in time, such as a time at which DCI message was acknowledged (e.g., time of ACK/NACK responsive to DCI message).

According to some beam update configurations, the relative timing of the update to the common beam may be based on the comparison of the time interval ($T_{Int}$) and the processing time threshold ($PT_{Thresh}$). In particular, the relative timing of the update to the common beam may be based on whether or not the time interval satisfies the processing time threshold. In some aspects, the time interval may satisfy the processing time threshold if the time interval is greater than or equal to the processing threshold (e.g., processing timeline satisfied if $T_{Int} \geq PT_{Thresh}$). In this regard, the communication scheduled by the DCI message may be scheduled after an end of the processing time threshold, thereby satisfying the processing time threshold and providing the UE 115-d with sufficient time to process the DCI message and perform the beam switching procedure (e.g., radio frequency component retuning).

Conversely, the time interval may fail to satisfy the processing time threshold if the time interval is less than the processing threshold (e.g., processing timeline not satisfied if $T_{Int} < PT_{Thresh}$). In this regard, the communication scheduled by the DCI message may be scheduled before an end of the processing time threshold, thereby failing to satisfy the processing time threshold due to the fact that the UE 115-d may not have sufficient time to process the DCI message and perform the beam switching procedure (e.g., radio frequency component retuning).

Accordingly, in some aspects, the UE 115-d may be configured to perform at least one beam switching procedure after performance of the communication scheduled by the DCI message if the time interval fails to satisfy the processing time threshold (e.g., update common beam after scheduled communication if $T_{Int} < PT_{Thresh}$). Conversely, the UE 115-d may be configured to perform at least one beam switching procedure prior to performance of the communication scheduled by the DCI message if the time interval satisfies the processing time threshold (e.g., update common beam before scheduled communication if $T_{Int} \geq PT_{Thresh}$).

At 535, the UE 115-d may perform at least one beam switching procedure to update the common beam. In some aspects, the UE 115-d may perform the at least one beam switching procedure based on the DCI message and in accordance with the beam update configuration. In this regard, the UE 115-d may update the common beam at 535 based on receiving the RRC message at 505, transmitting the processing time threshold at 510, receiving the DCI message at 515, identifying the beam update configuration at 520, identifying the time interval at 525, comparing the time interval and the processing time threshold at 530, or any combination thereof. For example, the UE 115-d may perform the at least one beam switching procedure based on (e.g., in accordance with) a common TCI state indicated in the DCI message.

For example, according to some beam update configurations, the UE 115-d may perform the beam switching procedure to update the common beam at 535 prior to performing the communication scheduled by the DCI message based on the comparison of the time interval and the processing time threshold at 530. In particular, according to some beam update configurations, the UE 115-d may perform the beam switching procedure to update the common beam at 535 prior to performing the communication scheduled by the DCI message if the time interval satisfies the processing time threshold (e.g., update common beam before scheduled communication at 535 if $T_{Int} \geq PT_{Thresh}$).

At 540, the UE 115-*d* may perform the communication scheduled by the DCI message. The communication may include a PDSCH transmission, a PUCCH transmission, a PUSCH transmission, or any combination thereof. In some aspects, the UE 115-*d* may perform the communication scheduled by the DCI message based on performing the at least one beam switching procedure at 535. In this regard, the UE 115-*d* may perform the communication scheduled by the DCI message using the updated common beam. For example, in cases where the time interval satisfies the processing time threshold (e.g., $T_{Int} \geq PT_{Thresh}$), the UE 115-*d* may update the common beam at 535, and may perform the communication at 540 using the updated common beam.

In additional or alternative cases, the UE 115-*d* may not perform the beam switching procedure at 535 prior to performing the communication at 540. For example, cases where the time interval fails to satisfy the processing time threshold (e.g., $T_{Int} < PT_{Thresh}$), the UE 115-*d* may refrain from performing the beam switching procedure at 535. In such cases, the UE 115-*d* may perform the communication at 540 using the same common beam which was used to receive the DCI message at 515. Thus, in cases where the UE 115-*d* refrains from performing the beam switching procedure at 535, the UE 115-*d* may perform the communication at 540, and the process flow 500 may proceed to 545.

At 545, the UE 115-*d* may perform at least one beam switching procedure to update the common beam. In some aspects, the UE 115-*d* may perform the at least one beam switching procedure based on the DCI message and in accordance with the beam update configuration. In this regard, the UE 115-*d* may update the common beam at 545 based on receiving the RRC message at 505, transmitting the processing time threshold at 510, receiving the DCI message at 515, identifying the beam update configuration at 520, identifying the time interval at 525, comparing the time interval and the processing time threshold at 530, performing the communication at 540, or any combination thereof. For example, the UE 115-*d* may perform the at least one beam switching procedure based on (e.g., in accordance with) a common TCI state indicated in the DCI message. Moreover, the UE 115-*d* may perform the beam switching procedure at 545 based on refraining from performing the beam switching procedure prior to the scheduled communication at 535.

For example, according to some beam update configurations, the UE 115-*d* may perform the beam switching procedure to update the common beam at 545 after performing the communication scheduled by the DCI message based on the comparison of the time interval and the processing time threshold at 530. In particular, according to some beam update configurations, the UE 115-*d* may perform the beam switching procedure to update the common beam at 545 after performing the communication scheduled by the DCI message if the time interval fails to satisfy the processing time threshold (e.g., update common beam after scheduled communication at 545 if $T_{Int} < PT_{Thresh}$). By performing the beam switching procedure at 545 after performance of the communication, the UE 115-*d* may be configured to perform the communication at 540 with the same common beam which was used to receive the DCI message at 515.

At 550, the UE 115-*d* may perform additional communications (e.g., PDCCH transmissions, PDSCH transmissions, PUCCH transmissions, PUSCH transmissions). with the base station 105-*b*. In some aspects, the UE 115-*d* may perform the additional communications with the base station 105-*b* based on performing the at least one beam switching procedure at 535, the at least one beam switching procedure 545, or both. In this regard, the UE 115-*d* may perform the additional communications using an updated common beam which was generated based on the beam switching procedure(s).

The techniques described herein may provide signaling and other configurations which indicate when the UE 115-*d* should implement updates to common beams. As such, the techniques described herein may enable the base station 105-*b* to update multiple beams (e.g., a common beam) at the UE 115-*d* using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at the UE 115-*d*, thereby improving the efficiency of wireless communications within the wireless communications system.

Figure 6:
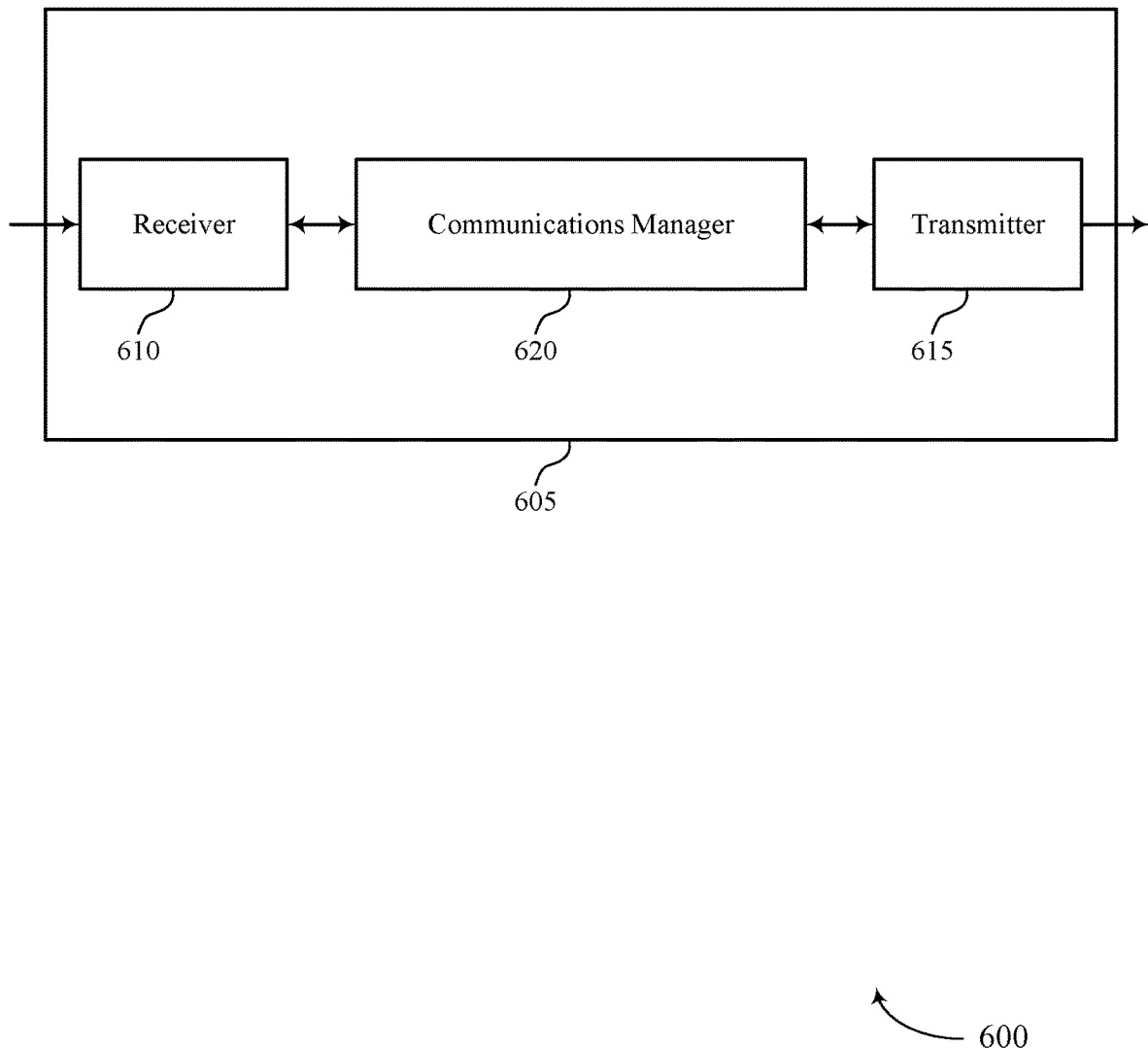
FIGS. 6 and 7 show block diagrams of devices that support techniques for common beam update rules for scheduled communications in accordance with aspects of the present disclosure.

FIG. 6 shows a block diagram 600 of a device 605 that supports techniques for common beam update rules for scheduled communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for common beam update rules for scheduled communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for common beam update rules for scheduled communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for common beam update rules for scheduled communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The communications manager 620 may be configured as or otherwise support a means for receiving, from a base station, the DCI message that schedules the communication and indicates the update to the common beam. The communications manager 620 may be configured as or otherwise support a means for performing at least one beam switching procedure to update the common beam for communications with the UE based on receiving the DCI message and in accordance with the beam update configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for signaling and other configurations which indicate when the UE 115 should implement updates to common beams. As such, the techniques described herein may enable the base station 105 to update multiple beams (e.g., a common beam) at the UE 115 using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at the UE 115, thereby improving the efficiency of wireless communications within the wireless communications system.

Figure 7:
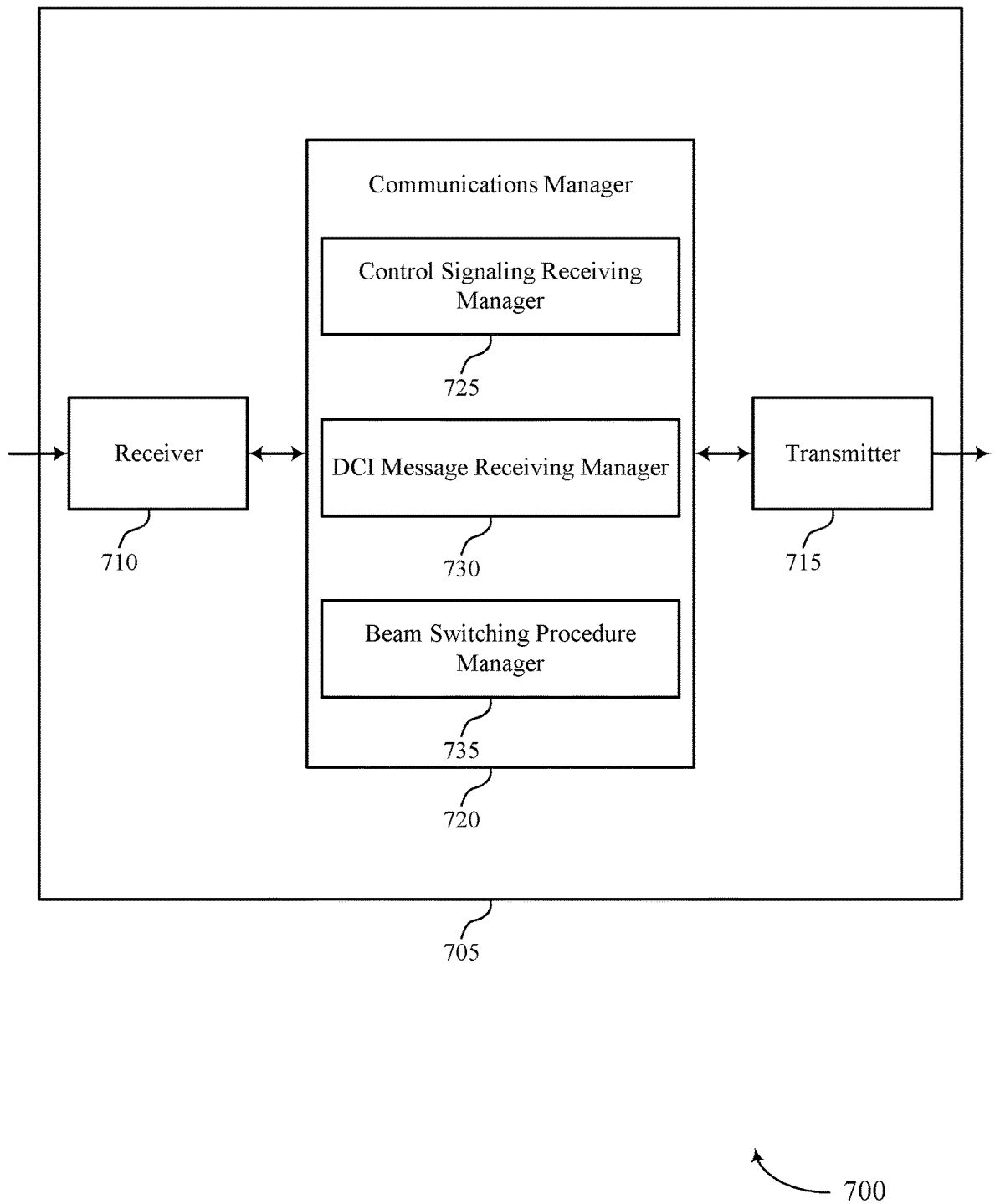

FIG. 7 shows a block diagram 700 of a device 705 that supports techniques for common beam update rules for scheduled communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for common beam update rules for scheduled communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for common beam update rules for scheduled communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for common beam update rules for scheduled communications as described herein. For example, the communications manager 720 may include a control signaling receiving manager 725, a DCI message receiving manager 730, a beam switching procedure manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control signaling receiving manager 725 may be configured as or otherwise support a means for receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The DCI message receiving manager 730 may be configured as or otherwise support a means for receiving, from a base station, the DCI message that schedules the communication and indicates the update to the common beam. The beam switching procedure manager 735 may be configured as or otherwise support a means for performing at least one beam switching procedure to update the common beam for communications with the UE based on receiving the DCI message and in accordance with the beam update configuration.

Figure 8:
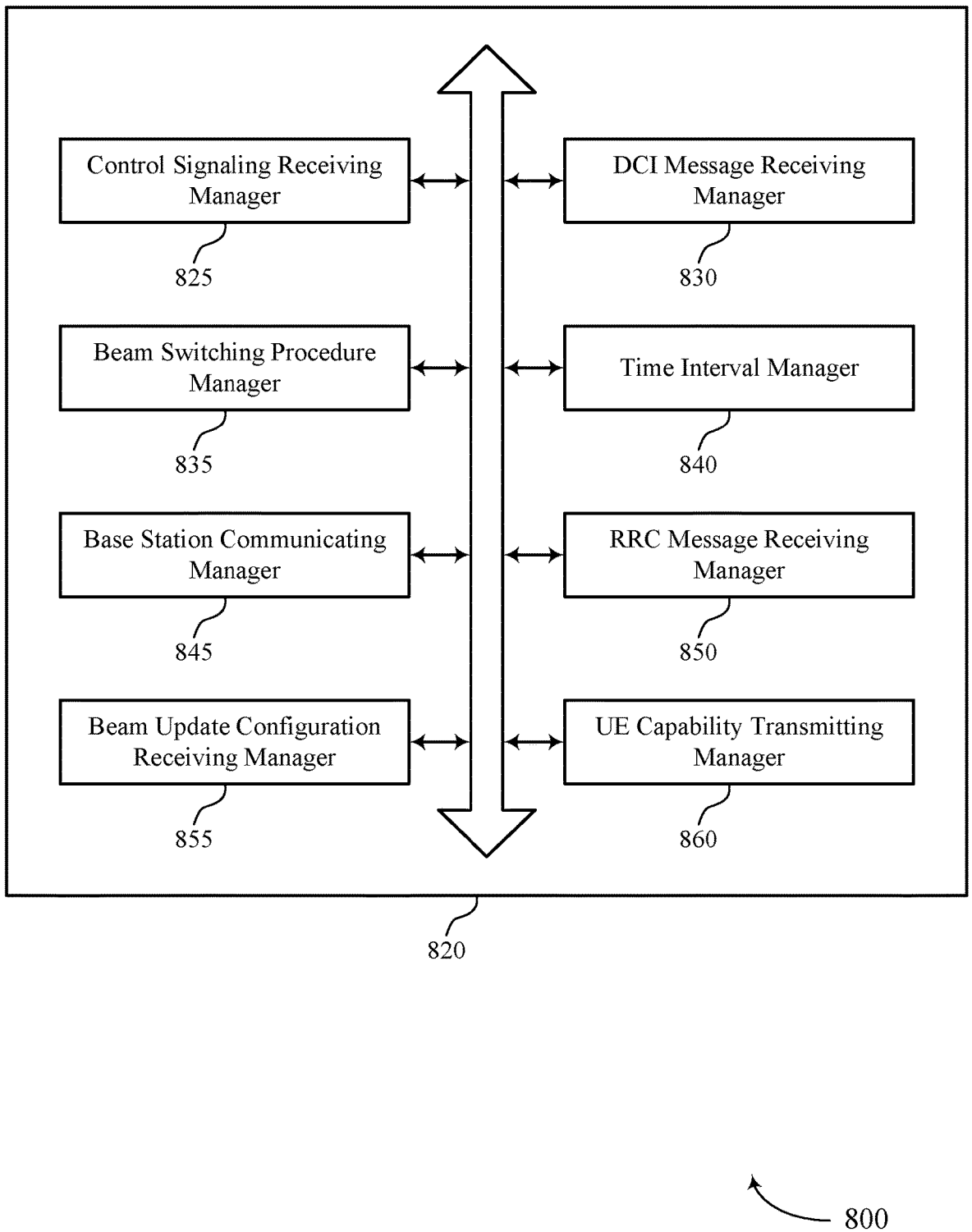
FIG. 8 shows a block diagram of a communications manager that supports techniques for common beam update rules for scheduled communications in accordance with aspects of the present disclosure.

FIG. 8 shows a block diagram 800 of a communications manager 820 that supports techniques for common beam update rules for scheduled communications in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for common beam update rules for scheduled communications as described herein. For example, the communications manager 820 may include a control signaling receiving manager 825, a DCI message receiving manager 830, a beam switching procedure manager 835, a time interval manager 840, a base station communicating manager 845, an RRC message receiving manager 850, a beam update configuration receiving manager 855, a UE capability transmitting manager 860, or any combination thereof. Each of these components may communicate, directly or indirectly, with one another (e.g., via one or more buses).

The communications manager 820 may support wireless communication at a UE in accordance with examples as disclosed herein. The control signaling receiving manager 825 may be configured as or otherwise support a means for receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The DCI message receiving manager 830 may be configured as or otherwise support a means for receiving, from a base station, the DCI message that schedules the communication and indicates the update to the common beam. The beam switching procedure manager 835 may be configured as or otherwise support a means for performing at least one beam switching procedure to update the common beam for communications with the UE based on receiving the DCI message and in accordance with the beam update configuration.

In some examples, to support performing the at least one beam switching procedure in accordance with the beam update configuration, the time interval manager 840 may be configured as or otherwise support a means for identifying a time interval between reception of the DCI message and the communication. In some examples, to support performing the at least one beam switching procedure in accordance with the beam update configuration, the beam switching procedure manager 835 may be configured as or otherwise support a means for performing the at least one beam switching procedure to update the common beam based on a comparison of the time interval with a processing time threshold of the UE.

In some examples, the beam switching procedure manager 835 may be configured as or otherwise support a means for performing the at least one beam switching procedure to update the common beam after performing the communication scheduled by the DCI based on the time interval being less than the processing time threshold. In some examples, the UE receives the DCI message and performs the communication scheduled by the DCI message using the same beam.

In some examples, the beam switching procedure manager 835 may be configured as or otherwise support a means for performing the at least one beam switching procedure to update the common beam prior to performing the communication scheduled by the DCI based on the time interval being greater than or equal to the processing time threshold. In some examples, the base station communicating manager 845 may be configured as or otherwise support a means for performing the communication scheduled by the DCI using the updated common beam and based on performing the at least one beam switching procedure.

In some examples, the UE capability transmitting manager 860 may be configured as or otherwise support a means for transmitting, to the base station, an indication of the processing time threshold, where receiving the DCI message is based on transmitting the processing time threshold. In some examples, the processing time threshold of the UE is based on a first time duration associated with downlink control channel processing at the UE, a second time duration associated with retuning radio frequency components at the UE, or both. In some examples, the processing time threshold of the UE includes a quantity of slots, a quantity of symbols, or both.

In some examples, to support performing the at least one beam switching procedure in accordance with the beam update configuration, the base station communicating manager 845 may be configured as or otherwise support a means for performing the communication scheduled by the DCI. In some examples, to support performing the at least one beam switching procedure in accordance with the beam update configuration, the beam switching procedure manager 835 may be configured as or otherwise support a means for performing the at least one beam switching procedure to update the common beam based on performing the communication scheduled by the DCI. In some examples, the UE receives the DCI message and performs the communication scheduled by the DCI message using the same beam.

In some examples, to support receiving the control signaling indicating the beam update configuration, the RRC message receiving manager 850 may be configured as or otherwise support a means for receiving, from the base station, an RRC message indicating one or more beam update configurations including the beam update configuration, where performing the at least one beam switching procedure in accordance with the beam update configuration is based on receiving the RRC message.

In some examples, the one or more beam update configurations indicated via the RRC message include a set of multiple beam update configurations, and the DCI message receiving manager 830 may be configured as or otherwise support a means for receiving, via the DCI message, an indication of the beam update configuration included within the set of multiple beam update configurations, where performing the at least one beam switching procedure in accordance with the beam update configuration is based on receiving the RRC message, the DCI message, or both.

In some examples, to support receiving the control signaling indicating the beam update configuration, the beam update configuration receiving manager 855 may be configured as or otherwise support a means for receiving an indication of the beam update configuration via the DCI message, where performing the at least one beam switching procedure in accordance with the beam update configuration is based on receiving the DCI message.

In some examples, the DCI message receiving manager 830 may be configured as or otherwise support a means for receiving, via the DCI message, a common TCI state for updating the common beam, where performance of the at least one beam switching procedure is based on the common TCI state.

In some examples, the communication includes a PDSCH transmission, a PUSCH transmission, a PUCCH transmission, or any combination thereof. In some examples, the common beam is shared across a downlink channel and an uplink channel.

In some examples, the common beam is shared across a first downlink channel and a second downlink channel. In some examples, the common beam is shared across a first uplink channel and a second uplink channel.

Figure 9:
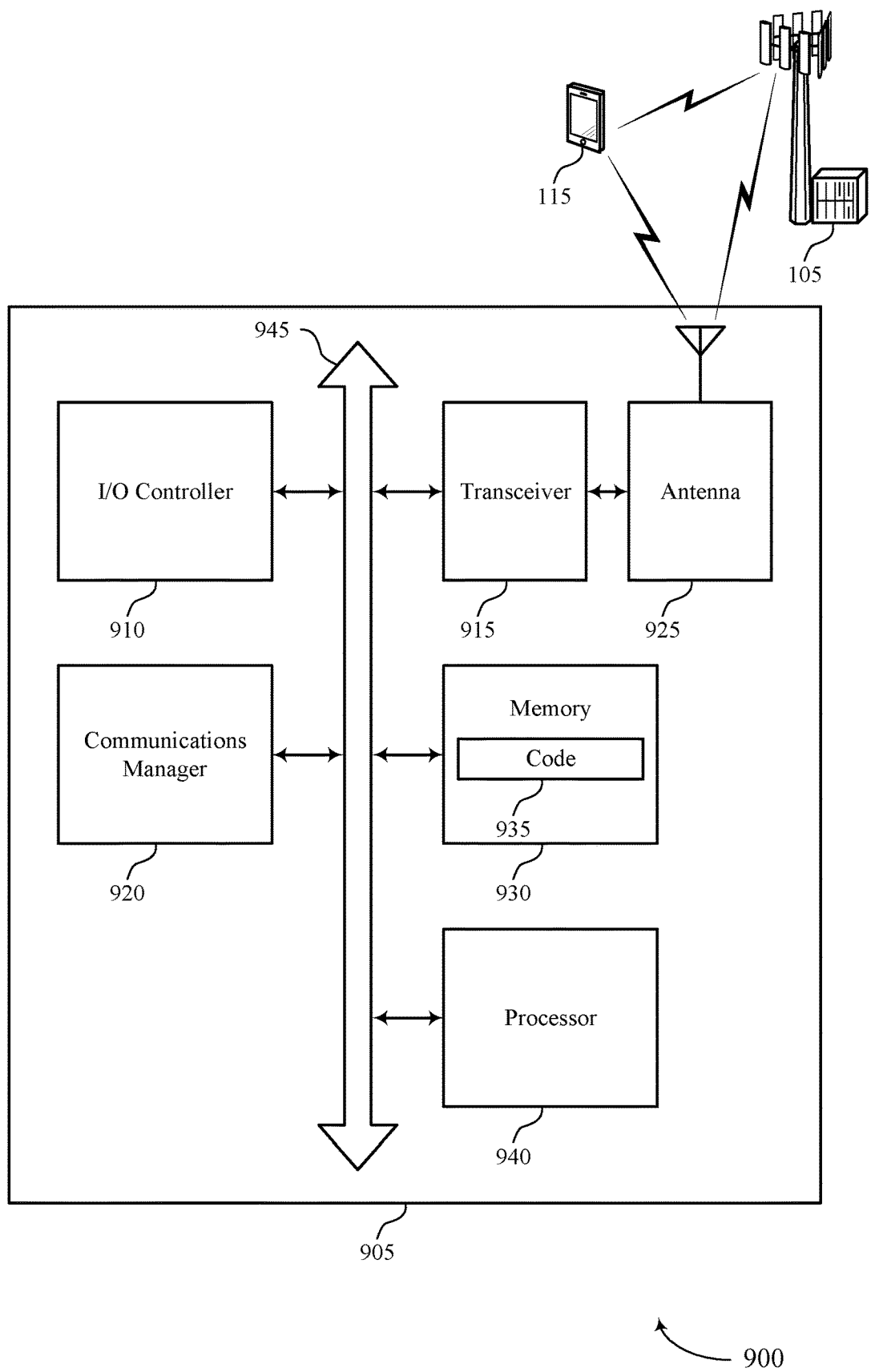
FIG. 9 shows a diagram of a system including a device that supports techniques for common beam update rules for scheduled communications in accordance with aspects of the present disclosure.

FIG. 9 shows a diagram of a system 900 including a device 905 that supports techniques for common beam update rules for scheduled communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for common beam update rules for scheduled communications). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The communications manager 920 may be configured as or otherwise support a means for receiving, from a base station, the DCI message that schedules the communication and indicates the update to the common beam. The communications manager 920 may be configured as or otherwise support a means for performing at least one beam switching procedure to update the common beam for communications with the UE based on receiving the DCI message and in accordance with the beam update configuration.

By including or configuring the communications manager 920 in accordance with examples as described herein, the device 905 may support techniques for signaling and other configurations which indicate when the UE 115 should implement updates to common beams. As such, the techniques described herein may enable the base station 105 to update multiple beams (e.g., a common beam) at the UE 115 using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at the UE 115, thereby improving the efficiency of wireless communications within the wireless communications system.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for common beam update rules for scheduled communications as described herein, or the processor 940 and the memory 930 may be otherwise configured to perform or support such operations.

Figure 10:
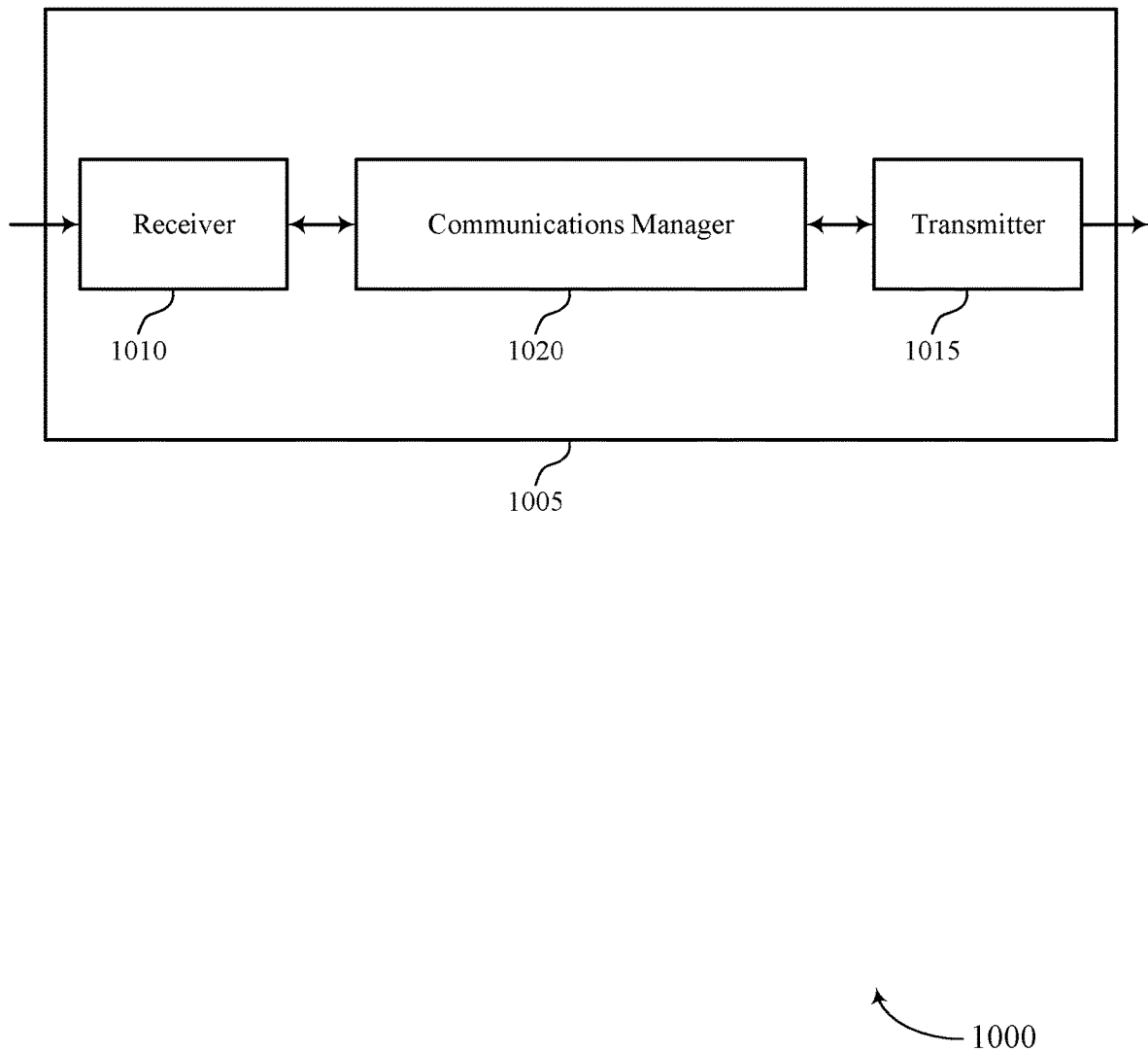
FIGS. 10 and 11 show block diagrams of devices that support techniques for common beam update rules for scheduled communications in accordance with aspects of the present disclosure.

FIG. 10 shows a block diagram 1000 of a device 1005 that supports techniques for common beam update rules for scheduled communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for common beam update rules for scheduled communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for common beam update rules for scheduled communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for common beam update rules for scheduled communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The communications manager 1020 may be configured as or otherwise support a means for transmitting, to the UE, the DCI message that schedules the communication and indicates the update to the common beam. The communications manager 1020 may be configured as or otherwise support a means for communicating with the UE via the communication, an additional transmission, or both, based on transmitting the DCI message and in accordance with the beam update configuration.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for signaling and other configurations which indicate when the UE 115 should implement updates to common beams. As such, the techniques described herein may enable the base station 105 to update multiple beams (e.g., a common beam) at the UE 115 using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at the UE 115, thereby improving the efficiency of wireless communications within the wireless communications system.

Figure 11:
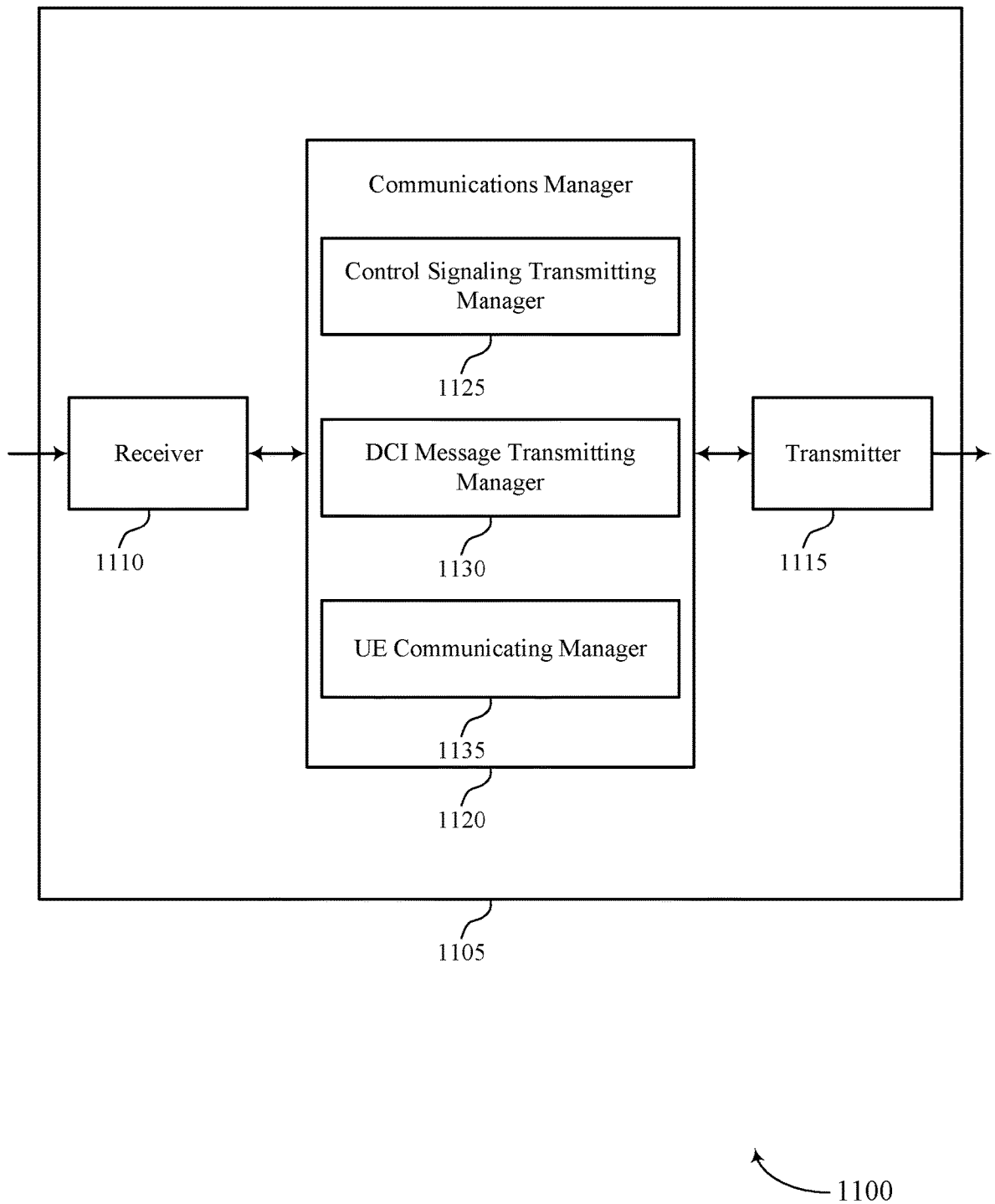

FIG. 11 shows a block diagram 1100 of a device 1105 that supports techniques for common beam update rules for scheduled communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for common beam update rules for scheduled communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for common beam update rules for scheduled communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for common beam update rules for scheduled communications as described herein. For example, the communications manager 1120 may include a control signaling transmitting manager 1125, a DCI message transmitting manager 1130, a UE communicating manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The control signaling transmitting manager 1125 may be configured as or otherwise support a means for transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The DCI message transmitting manager 1130 may be configured as or otherwise support a means for transmitting, to the UE, the DCI message that schedules the communication and indicates the update to the common beam. The UE communicating manager 1135 may be configured as or otherwise support a means for communicating with the UE via the communication, an additional transmission, or both, based on transmitting the DCI message and in accordance with the beam update configuration.

Figure 12:
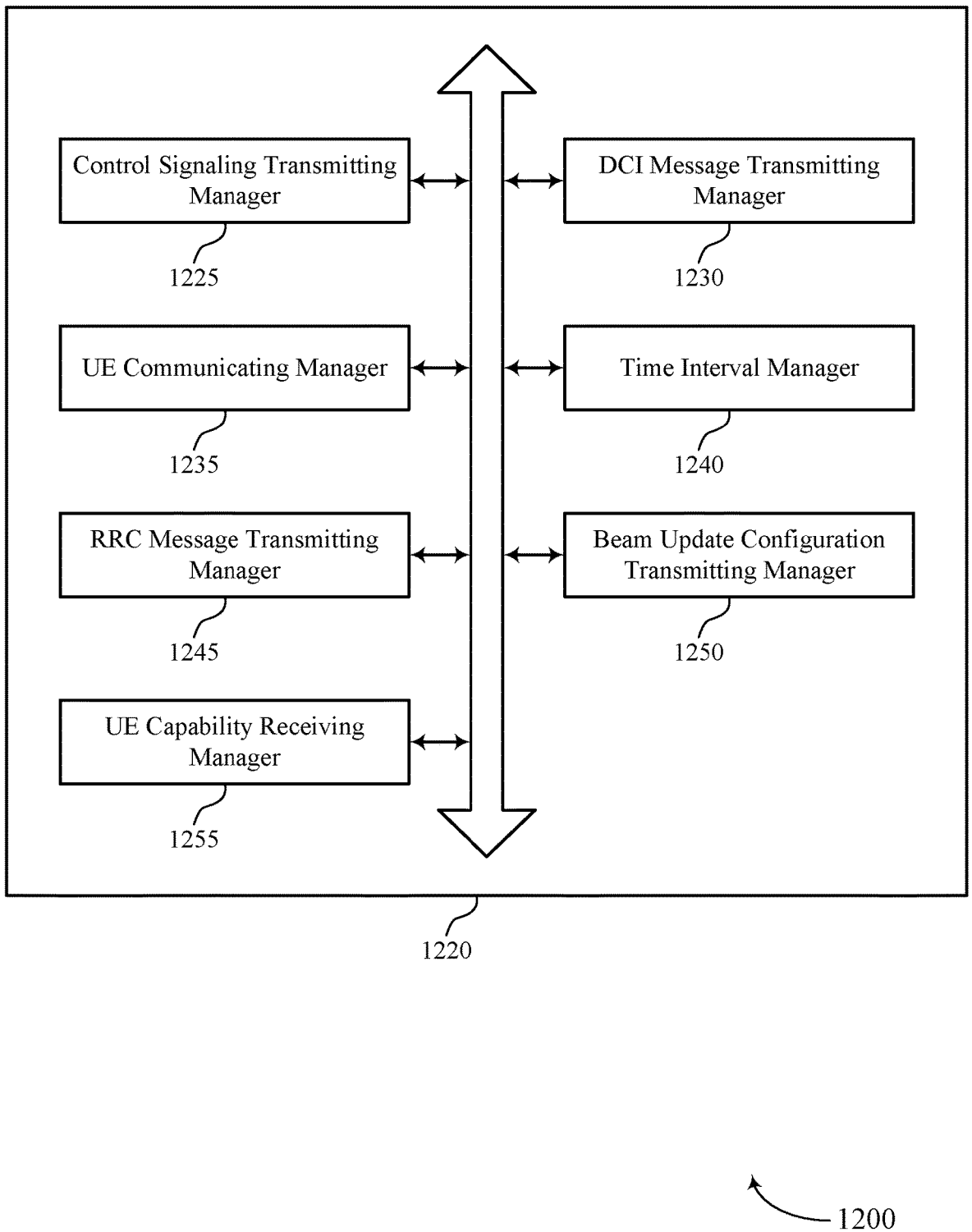
FIG. 12 shows a block diagram of a communications manager that supports techniques for common beam update rules for scheduled communications in accordance with aspects of the present disclosure.

FIG. 12 shows a block diagram 1200 of a communications manager 1220 that supports techniques for common beam update rules for scheduled communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for common beam update rules for scheduled communications as described herein. For example, the communications manager 1220 may include a control signaling transmitting manager 1225, a DCI message transmitting manager 1230, a UE communicating manager 1235, a time interval manager 1240, an RRC message transmitting manager 1245, a beam update configuration transmitting manager 1250, a UE capability receiving manager 1255, or any combination thereof. Each of these components may communicate, directly or indirectly, with one another (e.g., via one or more buses).

The communications manager 1220 may support wireless communication at a base station in accordance with examples as disclosed herein. The control signaling transmitting manager 1225 may be configured as or otherwise support a means for transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The DCI message transmitting manager 1230 may be configured as or otherwise support a means for transmitting, to the UE, the DCI message that schedules the communication and indicates the update to the common beam. The UE communicating manager 1235 may be configured as or otherwise support a means for communicating with the UE via the communication, an additional transmission, or both, based on transmitting the DCI message and in accordance with the beam update configuration.

In some examples, the time interval manager 1240 may be configured as or otherwise support a means for identifying a time interval between transmission of the DCI and the communication, where communicating with the UE in accordance with the beam update configuration is based on a comparison of the time interval with a processing time threshold of the UE.

In some examples, the UE capability receiving manager 1255 may be configured as or otherwise support a means for receiving, from the UE, an indication of the processing time threshold, where transmitting the DCI message is based on receiving the processing time threshold. In some examples, the processing time threshold of the UE is based on a first time duration associated with downlink control channel processing at the UE, a second time duration associated with retuning radio frequency components at the UE, or both. In some examples, the processing time threshold of the UE includes a quantity of slots, a quantity of symbols, or both.

In some examples, to support transmitting the control signaling indicating the beam update configuration, the RRC message transmitting manager 1245 may be configured as or otherwise support a means for transmitting, to the UE, an RRC message indicating one or more beam update configurations including the beam update configuration, where communicating with the UE in accordance with the beam update configuration is based on transmitting the RRC message.

In some examples, the one or more beam update configurations indicated via the RRC message include a set of multiple beam update configurations, and the DCI message transmitting manager 1230 may be configured as or otherwise support a means for transmitting, via the DCI message, an indication of the beam update configuration included within the set of multiple beam update configurations, where communicating with the UE in accordance with the beam update configuration is based on transmitting the RRC message, the DCI message, or both.

In some examples, to support transmitting the control signaling indicating the beam update configuration, the beam update configuration transmitting manager 1250 may be configured as or otherwise support a means for transmitting an indication of the beam update configuration via the DCI message, where communicating with the UE in accordance with the beam update configuration is based on transmitting the DCI message.

In some examples, the DCI message transmitting manager 1230 may be configured as or otherwise support a means for transmitting, via the DCI message, a common TCI state for updating the common beam, where communicating with the ULE in accordance with the beam update configuration is based on the common TCI state.

In some examples, the communication includes a PDSCH transmission, a PUSCH transmission, a PUCCH transmission, or any combination thereof. In some examples, the common beam is shared across a downlink channel and an uplink channel. In some examples, the common beam is shared across a first downlink channel and a second downlink channel. In some examples, the common beam is shared across a first uplink channel and a second uplink channel.

Figure 13:
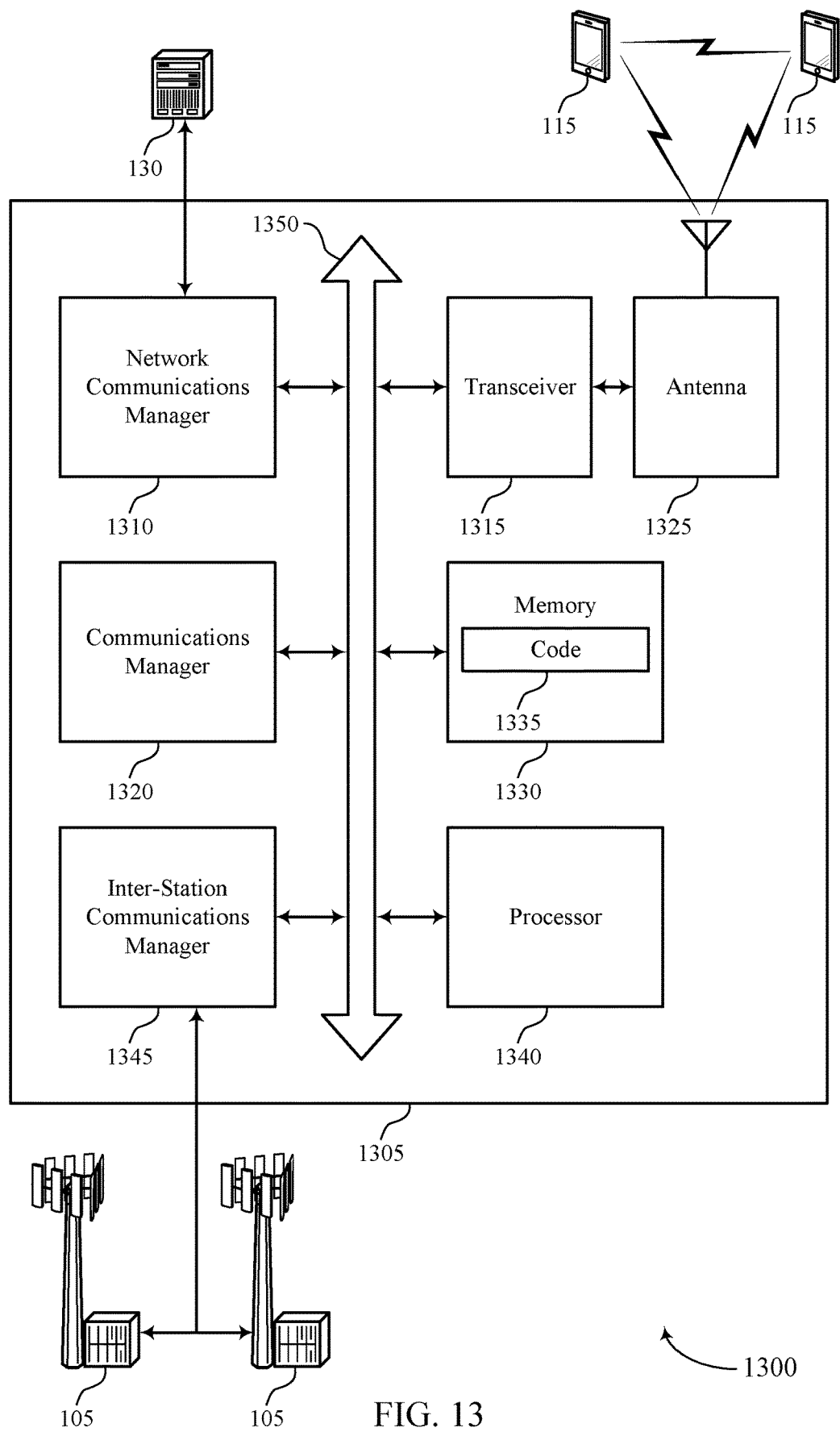
FIG. 13 shows a diagram of a system including a device that supports techniques for common beam update rules for scheduled communications in accordance with aspects of the present disclosure.

FIG. 13 shows a diagram of a system 1300 including a device 1305 that supports techniques for common beam update rules for scheduled communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for common beam update rules for scheduled communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The communications manager 1320 may be configured as or otherwise support a means for transmitting, to the UE, the DCI message that schedules the communication and indicates the update to the common beam. The communications manager 1320 may be configured as or otherwise support a means for communicating with the UE via the communication, an additional transmission, or both, based on transmitting the DCI message and in accordance with the beam update configuration.

By including or configuring the communications manager 1320 in accordance with examples as described herein, the device 1305 may support techniques for signaling and other configurations which indicate when the UE 115 should implement updates to common beams. As such, the techniques described herein may enable the base station 105 to update multiple beams (e.g., a common beam) at the UE 115 using a single DCI message. In this regard, techniques described herein may thereby reduce control signaling overhead and improve resource utilization in the wireless communications system. Moreover, by providing beam update configurations which define timings for implementing updates to common beams, techniques described herein may improve the speed and efficiency with which beams may be updated at the UE 115, thereby improving the efficiency of wireless communications within the wireless communications system.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for common beam update rules for scheduled communications as described herein, or the processor 1340 and the memory 1330 may be otherwise configured to perform or support such operations.

Figure 14:
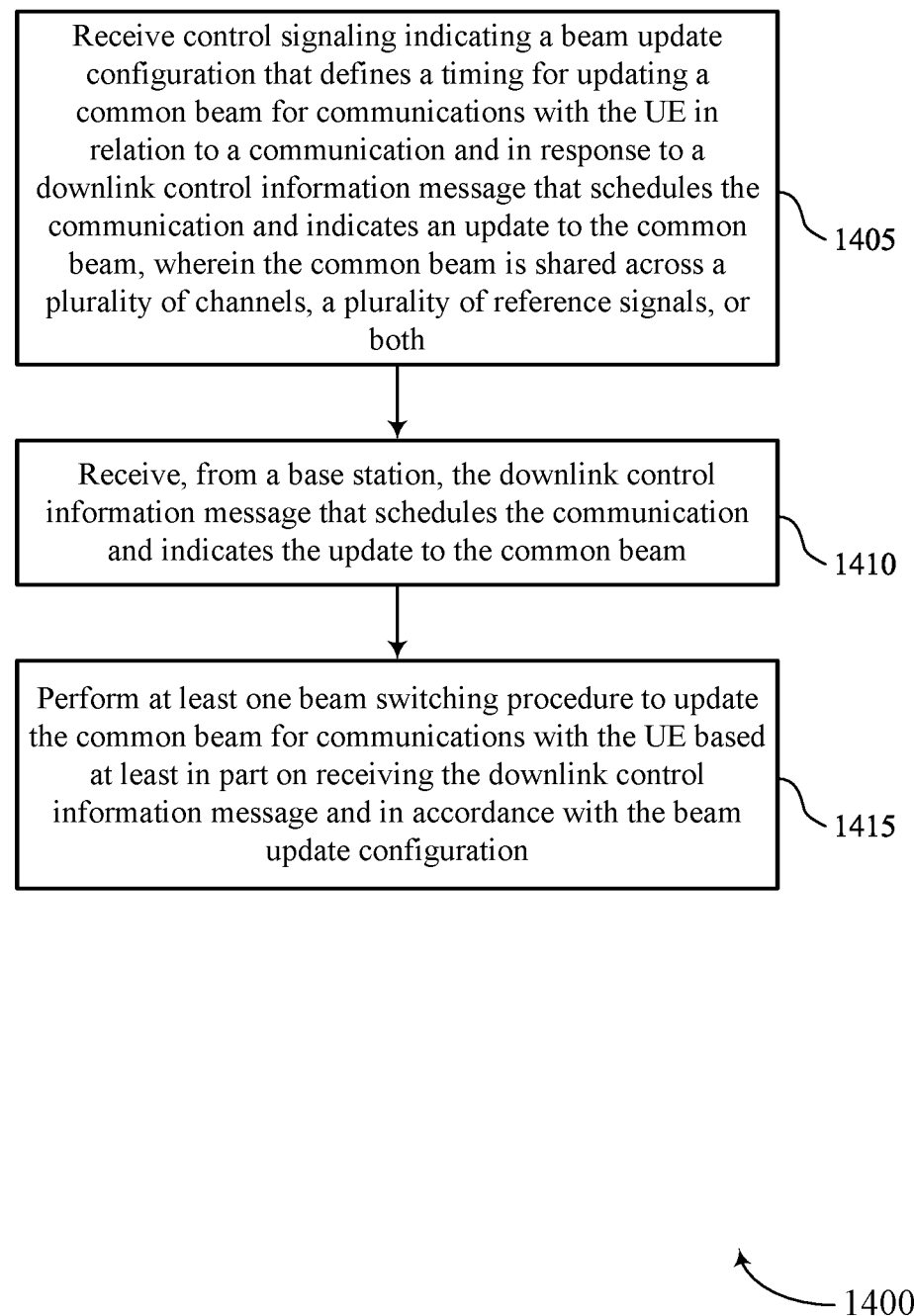
FIGS. 14 through 17 show flowcharts illustrating methods that support techniques for common beam update rules for scheduled communications in accordance with aspects of the present disclosure.

FIG. 14 shows a flowchart illustrating a method 1400 that supports techniques for common beam update rules for scheduled communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The operations of 1405 may be performed in accordance with examples as disclosed herein. In some examples, aspects of the operations of 1405 may be performed by a control signaling receiving manager 825 as described with reference to FIG. 8.

At 1410, the method may include receiving, from a base station, the DCI message that schedules the communication and indicates the update to the common beam. The operations of 1410 may be performed in accordance with examples as disclosed herein. In some examples, aspects of the operations of 1410 may be performed by a DCI message receiving manager 830 as described with reference to FIG. 8.

At 1415, the method may include performing at least one beam switching procedure to update the common beam for communications with the UE based on receiving the DCI message and in accordance with the beam update configuration. The operations of 1415 may be performed in accordance with examples as disclosed herein. In some examples, aspects of the operations of 1415 may be performed by a beam switching procedure manager 835 as described with reference to FIG. 8.

Figure 15:
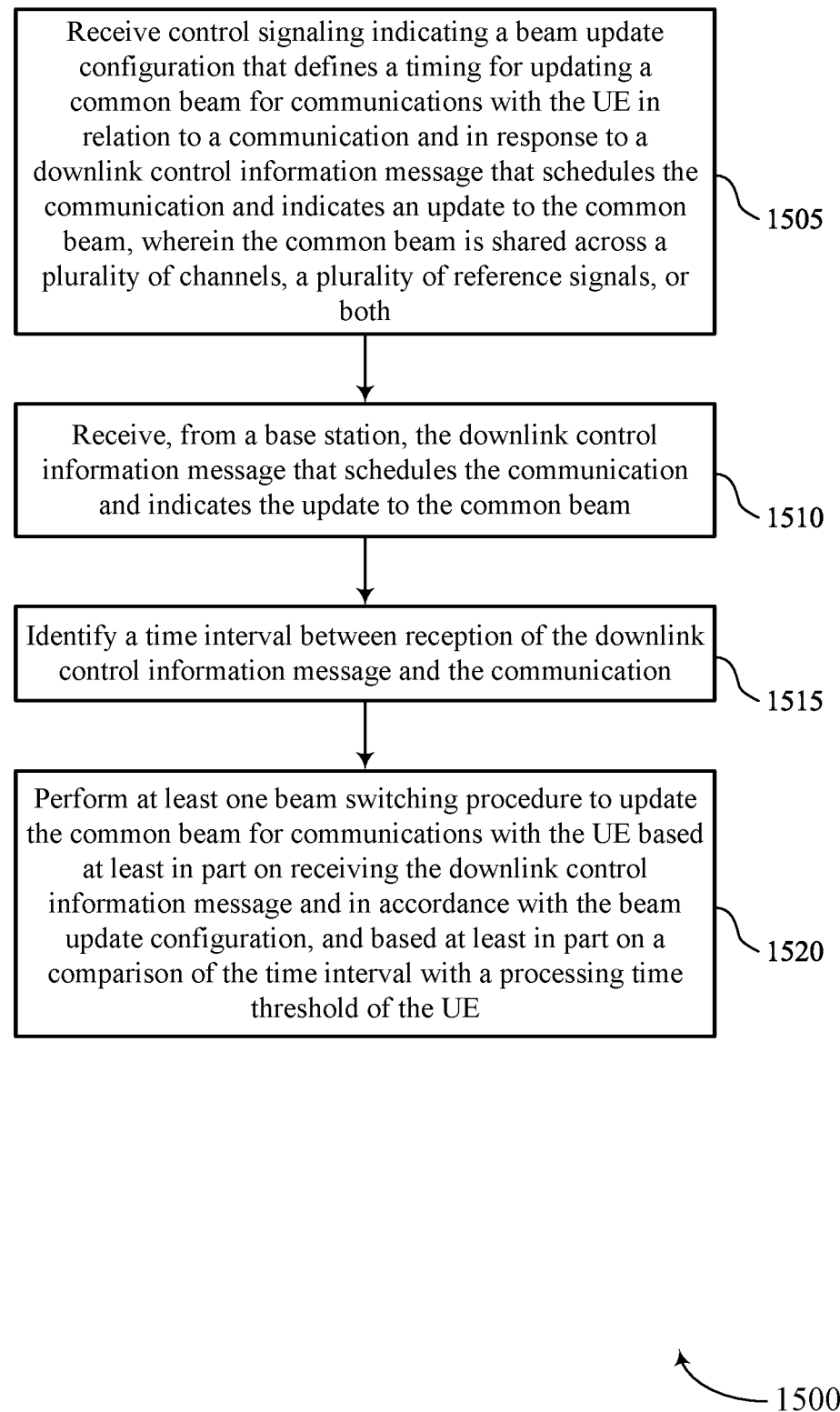

FIG. 15 shows a flowchart illustrating a method 1500 that supports techniques for common beam update rules for scheduled communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The operations of 1505 may be performed in accordance with examples as disclosed herein. In some examples, aspects of the operations of 1505 may be performed by a control signaling receiving manager 825 as described with reference to FIG. 8.

At 1510, the method may include receiving, from a base station, the DCI message that schedules the communication and indicates the update to the common beam. The operations of 1510 may be performed in accordance with examples as disclosed herein. In some examples, aspects of the operations of 1510 may be performed by a DCI message receiving manager 830 as described with reference to FIG. 8.

At 1515, the method may include identifying a time interval between reception of the DCI message and the communication. The operations of 1515 may be performed in accordance with examples as disclosed herein. In some examples, aspects of the operations of 1515 may be performed by a time interval manager 840 as described with reference to FIG. 8.

At 1520, the method may include performing at least one beam switching procedure to update the common beam for communications with the UE based on receiving the DCI message and in accordance with the beam update configuration, and based on a comparison of the time interval with a processing time threshold of the UE. The operations of 1520 may be performed in accordance with examples as disclosed herein. In some examples, aspects of the operations of 1520 may be performed by a beam switching procedure manager 835 as described with reference to FIG. 8.

Figure 16:
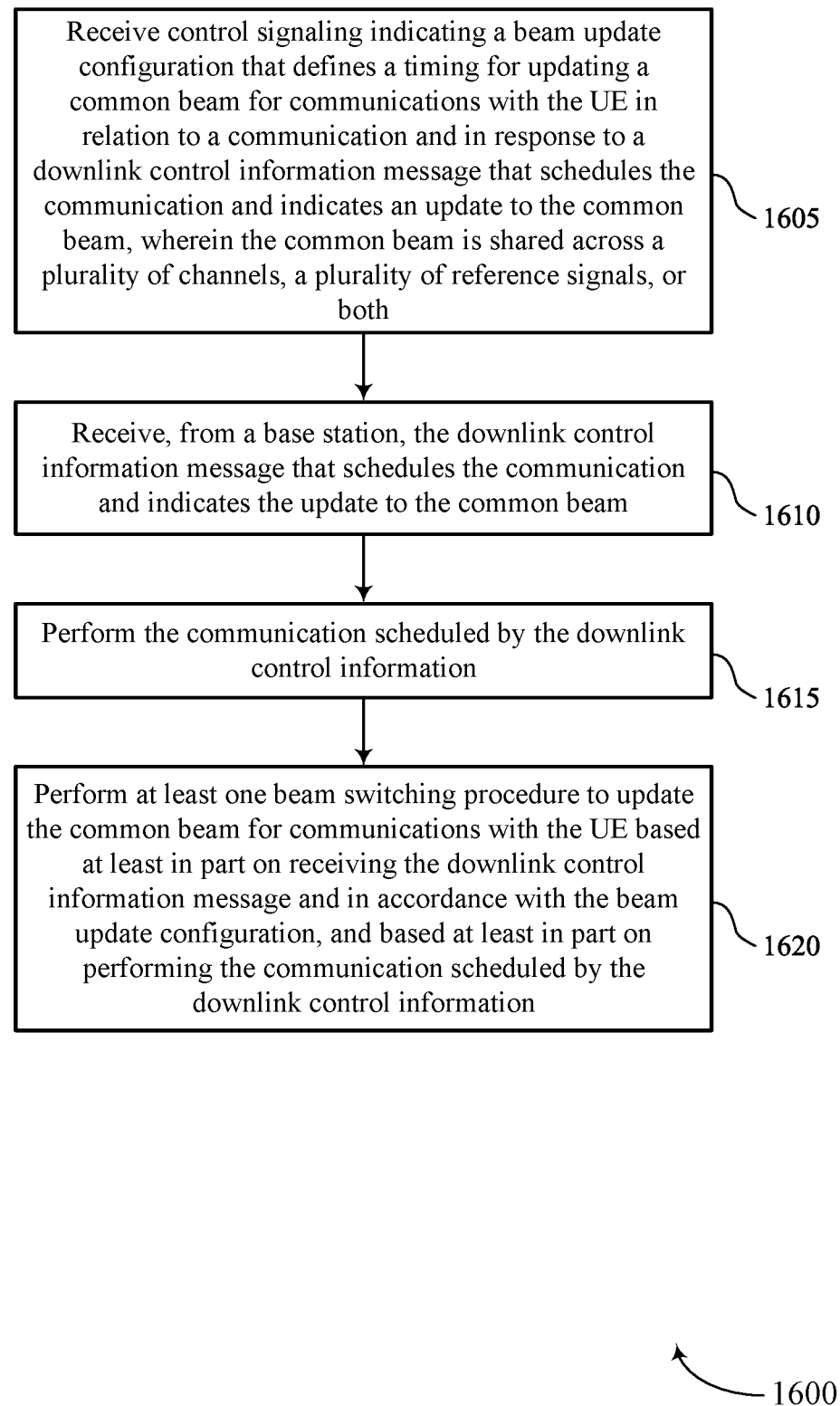

FIG. 16 shows a flowchart illustrating a method 1600 that supports techniques for common beam update rules for scheduled communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The operations of 1605 may be performed in accordance with examples as disclosed herein. In some examples, aspects of the operations of 1605 may be performed by a control signaling receiving manager 825 as described with reference to FIG. 8.

At 1610, the method may include receiving, from a base station, the DCI message that schedules the communication and indicates the update to the common beam. The operations of 1610 may be performed in accordance with examples as disclosed herein. In some examples, aspects of the operations of 1610 may be performed by a DCI message receiving manager 830 as described with reference to FIG. 8.

At 1615, the method may include performing the communication scheduled by the DCI. The operations of 1615 may be performed in accordance with examples as disclosed herein. In some examples, aspects of the operations of 1615 may be performed by a base station communicating manager 845 as described with reference to FIG. 8.

At 1620, the method may include performing at least one beam switching procedure to update the common beam for communications with the UE based on receiving the DCI message and in accordance with the beam update configuration, and based on performing the communication scheduled by the DCI. The operations of 1620 may be performed in accordance with examples as disclosed herein. In some examples, aspects of the operations of 1620 may be performed by a beam switching procedure manager 835 as described with reference to FIG. 8.

Figure 17:
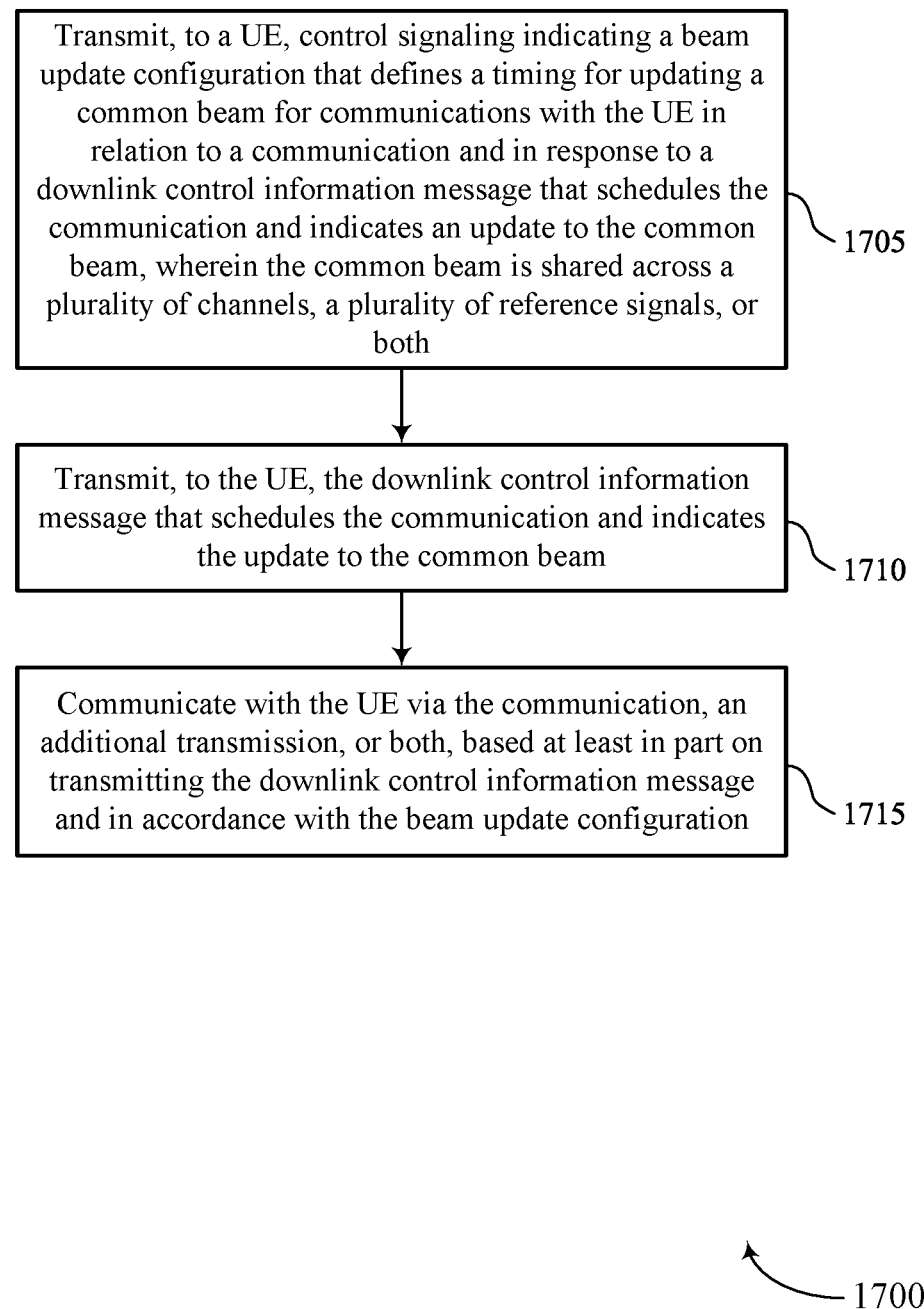

FIG. 17 shows a flowchart illustrating a method 1700 that supports techniques for common beam update rules for scheduled communications in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating a beam update configuration that defines a timing for updating a common beam for communications with the UE in relation to a communication and in response to a DCI message that schedules the communication and indicates an update to the common beam, where the common beam is shared across a set of multiple channels, a set of multiple reference signals, or both. The operations of 1705 may be performed in accordance with examples as disclosed herein. In some examples, aspects of the operations of 1705 may be performed by a control signaling transmitting manager 1225 as described with reference to FIG. 12.

At 1710, the method may include transmitting, to the UE, the DCI message that schedules the communication and indicates the update to the common beam. The operations of 1710 may be performed in accordance with examples as disclosed herein. In some examples, aspects of the operations of 1710 may be performed by a DCI message transmitting manager 1230 as described with reference to FIG. 12.

At 1715, the method may include communicating with the UE via the communication, an additional transmission, or both, based on transmitting the DCI message and in accordance with the beam update configuration. The operations of 1715 may be performed in accordance with examples as disclosed herein. In some examples, aspects of the operations of 1715 may be performed by a UE communicating manager 1235 as described with reference to FIG. 12.

The following provides an overview of aspects of the present disclosure:

Aspect 1: A method for wireless communication at a UE, comprising: receiving control signaling indicating a beam update configuration that defines a timing for updating a common beam for communications with the UE in relation to a communication and in response to a DCI message that schedules the communication and indicates an update to the common beam, wherein the common beam is shared across a plurality of channels, a plurality of reference signals, or both; receiving, from a base station, the DCI message that schedules the communication and indicates the update to the common beam; and performing at least one beam switching procedure to update the common beam for communications with the UE based at least in part on receiving the DCI message and in accordance with the beam update configuration.

Aspect 2: The method of aspect 1, wherein performing the at least one beam switching procedure in accordance with the beam update configuration comprises: identifying a time interval between reception of the DCI message and the communication; and performing the at least one beam switching procedure to update the common beam based at least in part on a comparison of the time interval with a processing time threshold of the UE.

Aspect 3: The method of aspect 2, further comprising: performing the at least one beam switching procedure to update the common beam after performing the communication scheduled by the DCI based at least in part on the time interval being less than the processing time threshold.

Aspect 4: The method of aspect 3, wherein the UE receives the DCI message and performs the communication scheduled by the DCI message using the same beam.

Aspect 5: The method of any of aspects 2 through 4, further comprising: performing the at least one beam switching procedure to update the common beam prior to performing the communication scheduled by the DCI based at least in part on the time interval being greater than or equal to the processing time threshold; and performing the communication scheduled by the DCI using the updated common beam and based at least in part on performing the at least one beam switching procedure.

Aspect 6: The method of any of aspects 2 through 5, further comprising: transmitting, to the base station, an indication of the processing time threshold, wherein receiving the DCI message is based at least in part on transmitting the processing time threshold.

Aspect 7: The method of any of aspects 2 through 6, wherein the processing time threshold of the UE is based at least in part on a first time duration associated with downlink control channel processing at the UE, a second time duration associated with retuning radio frequency components at the UE, or both.

Aspect 8: The method of any of aspects 2 through 7, wherein the processing time threshold of the UE comprises a quantity of slots, a quantity of symbols, or both.

Aspect 9: The method of any of aspects 1 through 8, wherein performing the at least one beam switching procedure in accordance with the beam update configuration comprises: performing the communication scheduled by the DCI; and performing the at least one beam switching procedure to update the common beam based at least in part on performing the communication scheduled by the DCI.

Aspect 10: The method of aspect 9, wherein the UE receives the DCI message and performs the communication scheduled by the DCI message using the same beam.

Aspect 11: The method of any of aspects 1 through 10, wherein receiving the control signaling indicating the beam update configuration comprises: receiving, from the base station, an RRC message indicating one or more beam update configurations including the beam update configuration, wherein performing the at least one beam switching procedure in accordance with the beam update configuration is based at least in part on receiving the RRC message.

Aspect 12: The method of aspect 11, wherein the one or more beam update configurations indicated via the RRC message comprise a plurality of beam update configurations, the method further comprising: receiving, via the DCI message, an indication of the beam update configuration included within the plurality of beam update configurations, wherein performing the at least one beam switching procedure in accordance with the beam update configuration is based at least in part on receiving the RRC message, the DCI message, or both.

Aspect 13: The method of any of aspects 1 through 12, wherein receiving the control signaling indicating the beam update configuration comprises: receiving an indication of the beam update configuration via the DCI message, wherein performing the at least one beam switching procedure in accordance with the beam update configuration is based at least in part on receiving the DCI message.

Aspect 14: The method of any of aspects 1 through 13, further comprising: receiving, via the DCI message, a common TCI state for updating the common beam, wherein performance of the at least one beam switching procedure is based at least in part on the common TCI state.

Aspect 15: The method of any of aspects 1 through 14, wherein the communication comprises a PDSCH transmission, a PUSCH transmission, a PUCCH transmission, or any combination thereof.

Aspect 16: The method of any of aspects 1 through 15, wherein the common beam is shared across a downlink channel and an uplink channel.

Aspect 17: The method of any of aspects 1 through 16, wherein the common beam is shared across a first downlink channel and a second downlink channel.

Aspect 18: The method of any of aspects 1 through 17, wherein the common beam is shared across a first uplink channel and a second uplink channel.

Aspect 19: A method for wireless communication at a base station, comprising: transmitting, to a UE, control signaling indicating a beam update configuration that defines a timing for updating a common beam for communications with the UE in relation to a communication and in response to a DCI message that schedules the communication and indicates an update to the common beam, wherein the common beam is shared across a plurality of channels, a plurality of reference signals, or both; transmitting, to the UE, the DCI message that schedules the communication and indicates the update to the common beam; and communicating with the UE via the communication, an additional transmission, or both, based at least in part on transmitting the DCI message and in accordance with the beam update configuration.

Aspect 20: The method of aspect 19, further comprising: identifying a time interval between transmission of the DCI and the communication, wherein communicating with the UE in accordance with the beam update configuration is based at least in part on a comparison of the time interval with a processing time threshold of the UE.

Aspect 21: The method of aspect 20, further comprising: receiving, from the UE, an indication of the processing time threshold, wherein transmitting the DCI message is based at least in part on receiving the processing time threshold.

Aspect 22: The method of any of aspects 20 through 21, wherein the processing time threshold of the UE is based at least in part on a first time duration associated with downlink control channel processing at the UE, a second time duration associated with retuning radio frequency components at the UE, or both.

Aspect 23: The method of any of aspects 20 through 22, wherein the processing time threshold of the UE comprises a quantity of slots, a quantity of symbols, or both.

Aspect 24: The method of any of aspects 19 through 23, wherein transmitting the control signaling indicating the beam update configuration comprises: transmitting, to the UE, an RRC message indicating one or more beam update configurations including the beam update configuration, wherein communicating with the UE in accordance with the beam update configuration is based at least in part on transmitting the RRC message.

Aspect 25: The method of aspect 24, wherein the one or more beam update configurations indicated via the RRC message comprise a plurality of beam update configurations, the method further comprising: transmitting, via the DCI message, an indication of the beam update configuration included within the plurality of beam update configurations, wherein communicating with the UE in accordance with the beam update configuration is based at least in part on transmitting the RRC message, the DCI message, or both.

Aspect 26: The method of any of aspects 19 through 25, wherein transmitting the control signaling indicating the beam update configuration comprises: transmitting an indication of the beam update configuration via the DCI message, wherein communicating with the UE in accordance with the beam update configuration is based at least in part on transmitting the DCI message.

Aspect 27: The method of any of aspects 19 through 26, further comprising: transmitting, via the DCI message, a common TCI state for updating the common beam, wherein communicating with the UE in accordance with the beam update configuration is based at least in part on the common TCI state.

Aspect 28: The method of any of aspects 19 through 27, wherein the communication comprises a PDSCH transmission, a PUSCH transmission, a PUCCH transmission, or any combination thereof.

Aspect 29: The method of any of aspects 19 through 28, wherein the common beam is shared across a downlink channel and an uplink channel.

Aspect 30: The method of any of aspects 19 through 29, wherein the common beam is shared across a first downlink channel and a second downlink channel.

Aspect 31: The method of any of aspects 19 through 30, wherein the common beam is shared across a first uplink channel and a second uplink channel.

Aspect 32: An apparatus for wireless communication at a UE, comprising a processor; memory coupled with the processor; and instructions stored in the memory and executable by the processor to cause the apparatus to perform a method of any of aspects 1 through 18.

Aspect 33: An apparatus for wireless communication at a UE, comprising at least one means for performing a method of any of aspects 1 through 18.

Aspect 34: A non-transitory computer-readable medium storing code for wireless communication at a UE, the code comprising instructions executable by a processor to perform a method of any of aspects 1 through 18.

Aspect 35: An apparatus for wireless communication at a base station, comprising a processor; memory coupled with the processor; and instructions stored in the memory and executable by the processor to cause the apparatus to perform a method of any of aspects 19 through 31.

Aspect 36: An apparatus for wireless communication at a base station, comprising at least one means for performing a method of any of aspects 19 through 31.

Aspect 37: A non-transitory computer-readable medium storing code for wireless communication at a base station, the code comprising instructions executable by a processor to perform a method of any of aspects 19 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving control signaling indicating a beam update configuration that defines a timing for updating a common beam for communications with the UE in relation to a feedback message communicated in response to a downlink control information message, wherein the downlink control information message schedules a communication and indicates an update to the common beam, wherein the common beam is shared across a plurality of channels, a plurality of reference signals, or both;
    receiving, from a network entity, the downlink control information message that schedules the communication and indicates the update to the common beam;
    transmitting, to the network entity, the feedback message in response to the downlink control information message; and
    performing at least one beam switching procedure to update the common beam for communications with the UE based at least in part on transmitting the feedback message, wherein, in accordance with the beam update configuration, the timing for performing the at least one beam switching procedure is based at least in part on a timing of the feedback message.

2. The method of claim 1, wherein performing the at least one beam switching procedure in accordance with the beam update configuration comprises:
    performing the communication scheduled by the downlink control information message; and
    performing the at least one beam switching procedure to update the common beam based at least in part on performing the communication scheduled by the downlink control information message.

3. The method of claim 2, wherein the UE receives the downlink control information message and performs the communication scheduled by the downlink control information message using a same beam.

4. The method of claim 1, wherein performing the at least one beam switching procedure in accordance with the beam update configuration comprises:
    identifying a time interval between transmission of the feedback message and the communication; and
    performing the at least one beam switching procedure to update the common beam based at least in part on a comparison of the time interval with a processing time threshold of the UE.

5. The method of claim 4, further comprising:
    performing the at least one beam switching procedure to update the common beam after performing the communication scheduled by the downlink control information message based at least in part on the time interval being less than the processing time threshold.

6. The method of claim 5, wherein the UE receives the downlink control information message and performs the communication scheduled by the downlink control information message using a same beam.

7. The method of claim 4, further comprising:
    performing the at least one beam switching procedure to update the common beam prior to performing the communication scheduled by the downlink control information message based at least in part on the time interval being greater than or equal to the processing time threshold; and
    performing the communication scheduled by the downlink control information message using the updated common beam and based at least in part on performing the at least one beam switching procedure.

8. The method of claim 4, further comprising:
    transmitting, to the network entity, an indication of the processing time threshold, wherein receiving the downlink control information message is based at least in part on transmitting the processing time threshold.

9. The method of claim 4, wherein the processing time threshold of the UE is based at least in part on a first time duration associated with downlink control channel processing at the UE, a second time duration associated with retuning radio frequency components at the UE, or both.

10. The method of claim 4, wherein the processing time threshold of the UE comprises a quantity of slots, a quantity of symbols, or both.

11. The method of claim 1, wherein receiving the control signaling indicating the beam update configuration comprises:
    receiving, from the network entity, a radio resource control message indicating one or more beam update configurations including the beam update configuration, wherein performing the at least one beam switching procedure in accordance with the beam update configuration is based at least in part on receiving the radio resource control message.

12. The method of claim 11, wherein the one or more beam update configurations indicated via the radio resource control message comprise a plurality of beam update configurations, the method further comprising:
    receiving, via the downlink control information message, an indication of the beam update configuration included within the plurality of beam update configurations, wherein performing the at least one beam switching procedure in accordance with the beam update configuration is based at least in part on receiving the radio resource control message, the downlink control information message, or both.

13. The method of claim 1, wherein receiving the control signaling indicating the beam update configuration comprises:
receiving an indication of the beam update configuration via the downlink control information message, wherein performing the at least one beam switching procedure in accordance with the beam update configuration is based at least in part on receiving the downlink control information message.

14. The method of claim 1, further comprising:
receiving, via the downlink control information message, a common transmission-configuration indicator state for updating the common beam, wherein performance of the at least one beam switching procedure is based at least in part on the common transmission-configuration indicator state.

15. The method of claim 1, wherein the communication comprises a physical downlink shared channel transmission, a physical uplink shared channel transmission, a physical uplink control channel transmission, or any combination thereof.

16. The method of claim 1, wherein the common beam is shared across a downlink channel and an uplink channel.

17. The method of claim 1, wherein the common beam is shared across a first downlink channel and a second downlink channel.

18. The method of claim 1, wherein the common beam is shared across a first uplink channel and a second uplink channel.

19. A method for wireless communication at a network entity, comprising:
transmitting, to a user equipment (UE), control signaling indicating a beam update configuration that defines a timing for updating a common beam for communications with the UE in relation to a feedback message communicated in response to a downlink control information message, wherein the downlink control information message schedules a communication and indicates an update to the common beam, wherein the common beam is shared across a plurality of channels, a plurality of reference signals, or both;
transmitting, to the UE, the downlink control information message that schedules the communication and indicates the update to the common beam;
receiving, from the UE, the feedback message in response to the downlink control information message; and
communicating with the UE via the communication, an additional transmission, or both, based at least in part on receiving the feedback message and in accordance with the beam update configuration.

20. The method of claim 19, further comprising:
identifying a time interval between transmission of the downlink control information message and the communication, wherein communicating with the UE in accordance with the beam update configuration is based at least in part on a comparison of the time interval with a processing time threshold of the UE.

21. The method of claim 20, further comprising:
receiving, from the UE, an indication of the processing time threshold, wherein transmitting the downlink control information message is based at least in part on receiving the processing time threshold.

22. The method of claim 20, wherein the processing time threshold of the UE is based at least in part on a first time duration associated with downlink control channel processing at the UE, a second time duration associated with retuning radio frequency components at the UE, or both.

23. The method of claim 20, wherein the processing time threshold of the UE comprises a quantity of slots, a quantity of symbols, or both.

24. The method of claim 19, wherein transmitting the control signaling indicating the beam update configuration comprises:
transmitting, to the UE, a radio resource control message indicating one or more beam update configurations including the beam update configuration, wherein communicating with the UE in accordance with the beam update configuration is based at least in part on transmitting the radio resource control message.

25. The method of claim 24, wherein the one or more beam update configurations indicated via the radio resource control message comprise a plurality of beam update configurations, the method further comprising:
transmitting, via the downlink control information message, an indication of the beam update configuration included within the plurality of beam update configurations, wherein communicating with the UE in accordance with the beam update configuration is based at least in part on transmitting the radio resource control message, the downlink control information message, or both.

26. The method of claim 19, wherein transmitting the control signaling indicating the beam update configuration comprises:
transmitting an indication of the beam update configuration via the downlink control information message, wherein communicating with the UE in accordance with the beam update configuration is based at least in part on transmitting the downlink control information message.

27. The method of claim 19, further comprising:
transmitting, via the downlink control information message, a common transmission-configuration indicator state for updating the common beam, wherein communicating with the UE in accordance with the beam update configuration is based at least in part on the common transmission-configuration indicator state.

28. The method of claim 19, wherein the communication comprises a physical downlink shared channel transmission, a physical uplink shared channel transmission, a physical uplink control channel transmission, or any combination thereof.

29. An apparatus for wireless communication at a user equipment (UE), comprising:
at least one processor;
at least one memory coupled with the at least one processor; and
instructions stored in the at least one memory and executable by the at least one processor to cause the apparatus to:
receive control signaling indicating a beam update configuration that defines a timing for updating a common beam for communications with the UE in relation to a feedback message communicated in response to a downlink control information message, wherein the downlink control information message schedules a communication and indicates an update to the common beam, wherein the common beam is shared across a plurality of channels, a plurality of reference signals, or both;

receive, from a network entity, the downlink control information message that schedules the communication and indicates the update to the common beam;

transmit, to the network entity, the feedback message in response to the downlink control information message; and perform at least one beam switching procedure to update the common beam for communications with the UE based at least in part on transmitting the feedback message, wherein, in accordance with the beam update configuration, the timing for performing the at least one beam switching procedure is based at least in part on a timing of the feedback message.

30. An apparatus for wireless communication at a network entity, comprising:

at least one processor;

at least one memory coupled with the at least one processor; and instructions stored in the at least one memory and executable by the at least one processor to cause the apparatus to:

transmit, to a user equipment (UE), control signaling indicating a beam update configuration that defines a timing for updating a common beam for communications with the UE in relation to a feedback message communicated in response to a downlink control information message, wherein the downlink control information message schedules a communication and indicates an update to the common beam, wherein the common beam is shared across a plurality of channels, a plurality of reference signals, or both;

transmit, to the UE, the downlink control information message that schedules the communication and indicates the update to the common beam;

receive, from the UE, the feedback message in response to the downlink control information message; and communicate with the UE via the communication, an additional transmission, or both, based at least in part on receiving the feedback message and in accordance with the beam update configuration.

* * * * *